United States Patent
Kachemir et al.

(10) Patent No.: US 12,279,146 B2
(45) Date of Patent: *Apr. 15, 2025

(54) CROWD SOURCED PRIVACY PRESERVING ACCESS POINT MAPPING

(71) Applicant: Apple Inc., Cupertino, CA (US)

(72) Inventors: Rachid Kachemir, Mountain View, CA (US); Krishna M. Behara, Santa Clara, CA (US); Ashok Kumar Harikumar, Santa Clara, CA (US); Christopher R. Purcell, Dublin, CA (US); Welly Kasten, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,485

(22) Filed: Jun. 4, 2024

(65) Prior Publication Data
US 2024/0323742 A1  Sep. 26, 2024

Related U.S. Application Data

(63) Continuation of application No. 18/187,003, filed on Mar. 21, 2023, now Pat. No. 12,041,478, which is a
(Continued)

(51) Int. Cl.
*H04W 24/10* (2009.01)
*H04W 12/02* (2009.01)
(Continued)

(52) U.S. Cl.
CPC .......... *H04W 24/10* (2013.01); *H04W 48/16* (2013.01); *H04W 64/00* (2013.01); *H04W 76/10* (2018.02); *H04W 12/02* (2013.01)

(58) Field of Classification Search
CPC ..... H04W 24/10; H04W 48/16; H04W 64/00; H04W 76/10; H04W 12/02; H04W 84/12; H04W 24/02
(Continued)

(56) References Cited

U.S. PATENT DOCUMENTS

| | | | |
|---|---|---|---|
| 7,716,077 B1 * | 5/2010 | Mikurak | G06Q 10/0631 705/7.12 |
| 7,788,720 B2 * | 8/2010 | Patil | H04L 63/1441 709/224 |

(Continued)

FOREIGN PATENT DOCUMENTS

| | | |
|---|---|---|
| CA | 2808472 A1 | 3/2012 |
| CN | 108605199 A | 9/2018 |

(Continued)

*Primary Examiner* — Mahendra R Patel
(74) *Attorney, Agent, or Firm* — Invoke

(57) ABSTRACT

In some implementations, a computing system can perform crowd sourced access point mapping using privacy preserving techniques. For example, a server device can receive access point data reports from multiple user devices that includes various attributes and/or measurements with respect to access points with which the user devices have established connections. The access point data reports can be delivered without identifying the user devices, or users thereof, and their exact locations. Based on the access point data reports, the server device can map locations of access points and relationships between access points to generate network topologies, network locations, network quality scores, and various other characteristics of networks and/or access points. The generated access point data can be served to user devices so that the user devices can improve the efficiency of the interactions between user devices and the detected access points and/or networks.

20 Claims, 25 Drawing Sheets

Related U.S. Application Data continuation of application No. 17/383,321, filed on Jul. 22, 2021, now Pat. No. 11,641,596, which is a continuation of application No. 16/886,524, filed on May 28, 2020, now Pat. No. 11,109,258.

(60) Provisional application No. 62/855,553, filed on May 31, 2019.

(51) Int. Cl.
  *H04W 48/16* (2009.01)
  *H04W 64/00* (2009.01)
  *H04W 76/10* (2018.01)

(58) Field of Classification Search
  USPC .......................................................... 370/328
  See application file for complete search history.

(56) References Cited

U.S. PATENT DOCUMENTS

| | | | |
|---|---|---|---|
| 8,060,656 B2 * | 11/2011 | Hanson | H04L 1/188 |
| | | | 709/227 |
| 8,233,913 B2 | 7/2012 | Mendis | |
| 8,462,745 B2 | 6/2013 | Alizadeh-Shabdiz | |
| 8,886,886 B2 | 11/2014 | Biswas et al. | |
| 8,893,009 B2 | 11/2014 | Raleigh et al. | |
| 8,983,493 B2 * | 3/2015 | Brachet | H04W 4/024 |
| | | | 370/328 |
| 9,037,162 B2 | 5/2015 | Morgan et al. | |
| 9,103,900 B2 * | 8/2015 | Alizadeh-Shabdiz | H04B 7/26 |
| 9,491,585 B2 * | 11/2016 | Huang | H04W 4/33 |
| 9,572,019 B2 | 2/2017 | Raleigh et al. | |
| 9,638,784 B2 * | 5/2017 | Patel | G01S 5/02521 |
| 9,888,337 B1 * | 2/2018 | Zalewski | G06Q 30/0635 |
| 9,900,742 B1 * | 2/2018 | Thoresen | H04W 4/021 |
| 10,015,174 B2 * | 7/2018 | Verma | H04W 4/70 |
| 10,080,208 B2 * | 9/2018 | Morgan | G01S 5/0205 |
| 10,108,748 B2 * | 10/2018 | Marti | G06Q 30/0205 |
| 10,573,084 B2 | 2/2020 | Callaghan | |
| 10,708,823 B2 * | 7/2020 | Condeixa | H04W 4/44 |
| 10,841,839 B2 * | 11/2020 | Raleigh | H04M 15/41 |
| 10,880,676 B2 | 12/2020 | Connelly et al. | |
| 2007/0128899 A1 * | 6/2007 | Mayer | G06F 9/4406 |
| | | | 439/152 |
| 2007/0140163 A1 | 6/2007 | Meier et al. | |
| 2008/0177994 A1 * | 7/2008 | Mayer | G06F 16/00 |
| | | | 709/224 |
| 2008/0293404 A1 | 11/2008 | Scherzer et al. | |
| 2009/0282468 A1 | 11/2009 | Banga et al. | |
| 2010/0118830 A1 | 5/2010 | Stephenson et al. | |
| 2011/0286437 A1 | 11/2011 | Austin et al. | |
| 2011/0306345 A1 | 12/2011 | Wu | |
| 2013/0159511 A1 * | 6/2013 | Backholm | H04L 41/0823 |
| | | | 709/224 |
| 2014/0045536 A1 | 2/2014 | Sydir et al. | |
| 2014/0256356 A1 * | 9/2014 | Shen | G01S 5/14 |
| | | | 455/456.6 |
| 2015/0189511 A1 * | 7/2015 | Lapidous | H04L 63/0272 |
| | | | 726/15 |
| 2015/0327328 A1 | 11/2015 | Novak et al. | |
| 2016/0099963 A1 * | 4/2016 | Mahaffey | H04L 63/166 |
| | | | 726/25 |
| 2017/0026850 A1 | 1/2017 | Smith et al. | |
| 2017/0150362 A1 | 5/2017 | Clemenson et al. | |
| 2018/0167906 A1 * | 6/2018 | Chellamani | H04W 4/90 |
| 2018/0368007 A1 * | 12/2018 | Cummings | H04L 67/51 |
| 2019/0141537 A1 | 5/2019 | Jiang et al. | |
| 2020/0053068 A1 | 2/2020 | Rong et al. | |
| 2020/0076853 A1 * | 3/2020 | Pandian | H04L 61/4511 |
| 2020/0229050 A1 * | 7/2020 | Ljung | H04W 36/04 |
| 2020/0364187 A1 * | 11/2020 | Tran | G06N 3/02 |

FOREIGN PATENT DOCUMENTS

| | | | | |
|---|---|---|---|---|
| CN | 108882223 A | | 11/2018 | |
| EP | 3007474 A1 * | 4/2016 | | H04L 12/1407 |
| EP | 2999270 B1 | | 10/2017 | |
| EP | 2345284 B1 | | 6/2018 | |
| TW | 200838220 A | | 9/2008 | |
| WO | 2006/044667 A2 | | 4/2006 | |
| WO | 2015/127584 A1 | | 9/2015 | |
| WO | 2017/171754 A1 | | 10/2017 | |
| WO | 2018/080606 A1 | | 5/2018 | |
| WO | WO-2018118150 A1 * | 6/2018 | | H04L 63/0823 |

* cited by examiner

CROWD SOURCED PRIVACY PRESERVING ACCESS POINT MAPPING

INCORPORATION BY REFERENCE; DISCLAIMER

Each of the following applications are hereby incorporated by reference: application Ser. No. 18/187,003 filed on Mar. 21, 2023; application Ser. No. 17/383,321 filed on Jul. 22, 2021; application Ser. No. 16/886,524 filed on May 28, 2020; application No. 62/855,553 filed on May 31, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to collecting and distributing wireless access point data.

BACKGROUND

Wireless access points, Wi-Fi networks, and the like, are ubiquitous in today's world. Wireless access points are used by anyone, or everyone, who uses a mobile computing device. However, even though wireless access points are common, there are still instances where connecting to, or disconnecting from, an access point can be problematic or can cause frustration for the user of the computing device.

SUMMARY

In some implementations, a computing system can perform crowd sourced access point mapping using privacy preserving techniques. For example, a server device can receive access point data reports from multiple user devices that includes various attributes and/or measurements with respect to access points with which the user devices have established connections. The access point data reports can be delivered without identifying the user devices, or users thereof, and their exact locations. Based on the access point data reports, the server device can map locations of access points and relationships between access points to generate network topologies, network locations, network quality scores, and various other characteristics of networks and/or access points. The generated access point data can be served to user devices so that the user devices can improve the efficiency of the interactions between user devices and the detected access points and/or networks.

Particular implementations provide at least the following advantages. Access point data reports can be delivered in a privacy preserving manner that prevents other devices from tracking the reporting user devices, identifying the user devices (and their users), and/or determining the exact locations of the user devices. The user device can use the access point data generated by the server to avoid connecting to or recommending networks and/or access points that may be malicious (e.g., spoofed access points) or undesirable (e.g., captive access point). The user device can use the access point data generated by the server to recommend high quality networks and/or access points to the user so that the user's networking experience can be improved. The user device can use the access point data generated by the server to adjust the settings of the user device to reduce network data usage (e.g., reduce background updates or other background networking processes) when connected to moving access points and/or low quality networks to avoid impacting networking activities in which the user is currently engaging. The locations of access points determined by the server device can be used to automatically and/or quickly confirm and/or corroborate the shape of map elements (e.g., buildings, campuses, etc.) and their locations, identify errors in map data, and/or make corrections to map data.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
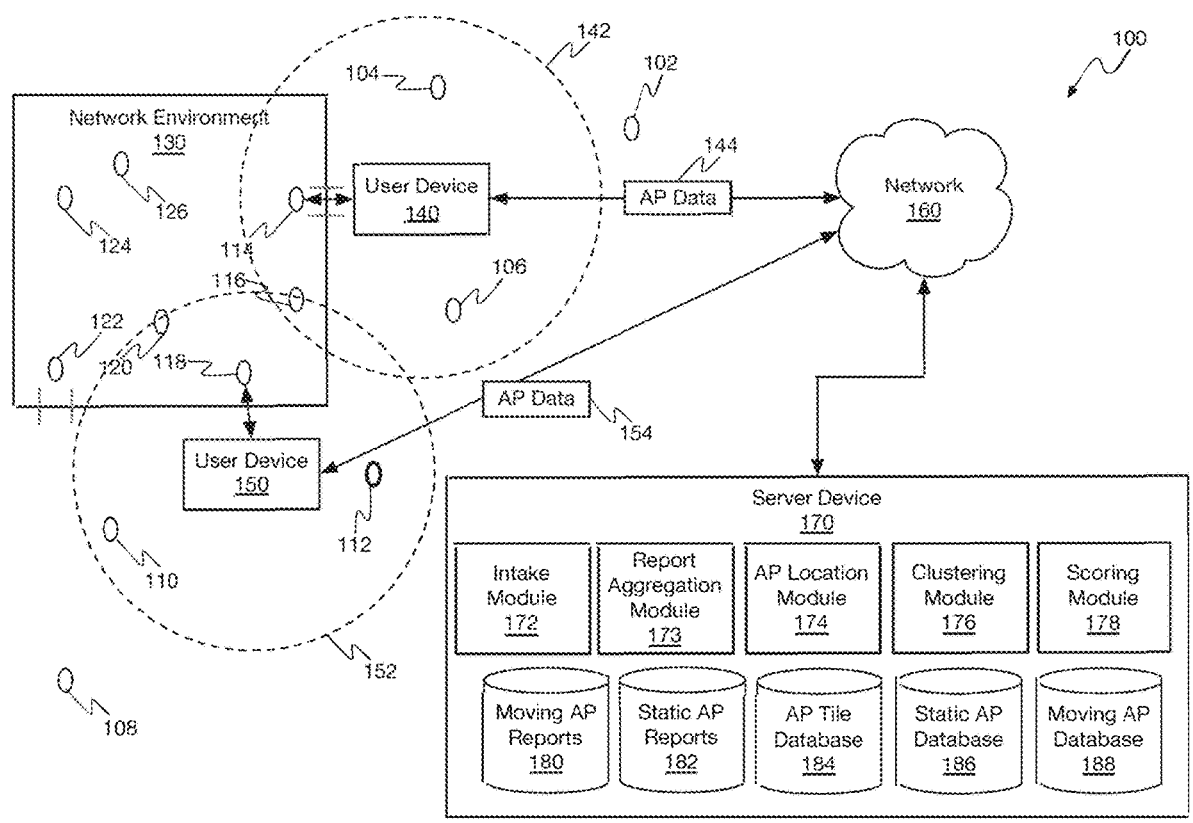
FIG. 1 is a block diagram of an example system for crowd sourced, privacy preserving access point mapping.

FIG. 1 is a block diagram of an example system 100 for crowd sourced, privacy preserving access point mapping. For example, access point data can be reported by user devices to a server device in such a way as to avoid providing information that can be used to identify user devices (and their users), avoid providing network identifiers which may include information identifying people and/or organizations, and avoid providing location information that can be used to track the exact location of the user devices. The access point data can be transmitted randomly (e.g., sometimes sent, sometimes not sent) to further prevent tracking the movements of user devices and to which networks the user devices connect. However, by crowd sourcing access point data from many anonymous user devices, the server can reconstruct or map network topologies and their locations and generate access point attributes, including access point/network quality scores, that can be used to recommend network access points, avoid network access points, adjust the behavior of user devices with respect to access points and networks, and benefit map data construction and validation.

In some implementations, system 100 can include access points 102-126. For example, the access points 102-126 can correspond to wireless access points that provide access to a network (e.g., the Internet, a local area network, a wide area network, etc.). Access points 102-126 can be wireless routers or some other access point hardware, for example.

Some access points 102-106 can be associated with different networks. For example, access point 104 can be associated with a first network (e.g., "coffee shop") while access point 124 can be associated with another network (e.g., "university"). Access point 104 may be associated with a small network (e.g., a home network, small store network, etc.) that may have just one access point. Some access points (e.g., access points 114-126) may be associated with the same network in a network environment (e.g., network environment 130). For example, a network environment may cover a geographic area corresponding to a school, campus, office building, shopping mall, airport, or the like. The network environment may correspond to a large network (e.g., in a shopping mall, university campus, airport, etc.) that has many access points covering a large geographic area.

Some access points may be malicious. For example, access point 112 may be configured with the same network identifier as that used for the access points within network environment 130 (e.g., a university environment, business environment, etc.) but access point 112 may be actually associated with, or managed by, bad actors attempting to collect information from user devices and/or access user devices. Access point 112 can be said to be spoofing or impersonating a legitimate access point of the network of network environment 130. Other types and/or configurations of access points and/or networks may be described further herein below.

In some implementations, system 100 can include user device 140 and user device 150. For example, while user device 140 and user device 150 may be mobile devices (e.g., smartphone, tablet computer, wearable device, smartwatch, etc.) that have different manufacturers, hardware profiles, and/or users, user device 140 and user device 150 can be configured similarly with respect to access point data reporting and access point data usage and features, as described herein. To simplify the descriptions herein and improve comprehension of this disclosure, the following descriptions will be provided primarily with respect to user device 140. However, the descriptions given with respect to user device 140 are also applicable to user device 150.

In some implementations, user device 140 can establish a connection to an access point. For example, as user device 140 moves around to different locations, user device 140 may connect to different wireless access points to access the Internet or other network resources. For example, user device 140 may establish a connection to a "home" network access point when the user of user device 140 is at home. User device 140 may establish a connection to a "work" network access point when the user of user device 140 is at work. User device 140 may establish a connection to a "coffee house" network access point when the user of user device 140 is at their favorite coffee house. User device 140 may establish a connection to various other networks (e.g., a "university" network, "airplane" network, etc.) through various other access points while moving around to different locations.

In some implementations, user device 140 can collect access point connection data associated with a current access point connection. For example, in response to connecting to an access point, user device 140 can collect access point connection data that describes various attributes of the currently connected access point for the current association (e.g., for the duration of the current connection). The attributes can be obtained from the signal or messages received from the connected access point. The attributes can be obtained from signals or messages received from other nearby (e.g., in range) access points. The attributes can be generated by user device 140 by measuring the performance of the connected access point.

The access point attributes for the connected access point can include an access point identifier (e.g., basic service set identifier-BSSID, MAC address, etc.) for the access point and a network identifier (e.g., service set identifier-SSID, network name, etc.) for the network to which the access point provides access.

The attributes can include access point identifiers for nearby access points to which user device 140 is not currently connected. For example, user device 140 can receive signals or messages from related access points that are on the same network (e.g., associated with the same network identifier) as the currently connected access point and store a list of related access points as an attribute of the currently connected access point. User device 140 can receive signals or messages from unrelated access points that are associated with networks that are different than the currently connected access point and store a list of unrelated access points as an attribute of the currently connected access point. User device 140 will not store and/or send network identifiers as a privacy protection measure since often times network identifiers include names of people, families, business, etc., and may be used to identify people and or businesses.

The attributes can include the location of user device 140 when connected to the connected access point. For example, the location can be the location of user device 140 when the connection was established, when the connection was terminated, or a location (e.g., centroid location) determined based on all locations of user device. The location can be a latitude/longitude location determined based on satellite positioning system data, Wi-Fi signal data, cellular signal data, or a combination thereof. The stored location can be truncated, rounded, or otherwise made slightly less accurate so that the location reported for user device 140 cannot be used to track the exact location of user device 140.

The attributes can include time attributes for the connection to the access point. For example, the time attributes can include a time of day when user device 140 is or was connected to the access point. The time of day can correspond to when the connection was established (e.g., start time), when the connection was terminated (e.g., end time), or a time representing the midpoint between the start time and end time of the connection. The time attributes can include a duration of the connection (e.g., start time–end time=duration).

The attributes can include a network configuration associated with the connected access point. For example, user device 140 can determine, based on the connection and the messages exchanged during the connection, various network configuration attributes. These attributes can include a security or authentication type for the network (e.g., open, WPA, WEP, EAP, etc.). These network configuration attributes can include which Wi-Fi physical connection protocol (e.g., 802.11ac, 802.11n, or other Wi-Fi protocol), which signal band frequency (e.g., 2.4 GHz, 5.0 GHZ, etc.) is used, etc. Other network configuration attributes can include flags (e.g., true/false) that indicate whether the network is/was captive (e.g., user must enter credentials or other information into a webpage before accessing the network), whether the access point or network is moving (e.g., such as an access point in an airplane, car, train, etc.), or whether the access point is part of an omnipresent network (e.g., a network covering a large geographic area, such as a university).

The attributes can include wifi signal quality information. For example, the signal quality attributes for the access point can include a received signal strength indicator (RSSI) value, a signal to noise ratio value, a clear channel assessment value, a channel width value, and/or low link quality metric value (low LQM) for the connected access point. Since these values may change over time, user device 140 can generate and report average values for these attributes.

The attributes can include network traffic attributes. For example, the network traffic attributes can include counts of the number of bytes or packets sent and/or received by user device 140. These attributes can include packets received (e.g., packets in), packets sent (e.g., packets out), total bytes received, total bytes out, total bytes received while user device 140 is active (e.g., user is using device, app is launched to foreground until device is locked), total bytes out while user device 140 is active.

The attributes can include TCP/data path statistics. For example, the data path statistics can include statistical values for the round-trip delay time. These statistical values can include minimum, average, variance round trip delay values while user device 140 is connected to the access point. These statistical values can include minimum, average, variance round trip delay values while user device 140 is active (e.g., user is using device, app is launched to foreground until device is locked) and connected to the access point. The data path statistics can include connection success and/or failure rate values. The data path statistics can include various error counters that indicate the number and types of errors detected during the connection with the access point. For example, these TCP errors can include the number of bytes retransmitted, the number of TCP data stalls, the number of duplicate bytes or packets received, the number of bytes or packets received out of order.

The attributes can include access point association attributes. For example, the association attributes can indicate a reason why user device 140 connected to (associated with) or disconnected from (disassociated from) the access point. Reasons for connecting can include unknown reason, automatic association, or manual (e.g., user initiated) association. The reasons for disconnecting can include unknown, automatic, manual (e.g., user initiated), power saving mode, etc.

After collecting the access point attributes, user device 140 can determine whether to send the access point attributes to server device 170 in an access point data report based on various reporting criteria. In some implementations, user device 140 can be configured to protect user privacy by only sending access point data reports (e.g., including access point attribute data) when certain conditions or criteria are met.

In some implementations, user device 140 can avoid sending access point data reports corresponding to connections to the user's home and/or work networks. User device 140 can determine, or estimate, that the user device 140 is connected to a home and/or work network based on location (e.g., the location of the user device 140 is the user's home or work). User device 140 can determine, or estimate, that the user device 140 is connected to a home and/or work network by determining the top 2 networks to which user device 140 most frequently connects. For example, the most frequent networks that most people use are their home networks and their work networks so these can be excluded from the access point data reports.

In some implementations, user device 140 can avoid sending access point data reports corresponding to temporary connections. For example, user device 140 may only send access point data reports for access point connections where the duration of the connection or association is greater than a configured period of time (e.g., 5 minutes, 10 minutes, 7 minutes, etc.). User device 140 may only send access point data reports for access point connections where the amount of data transmitted and/or received during the connection exceeds a threshold amount (e.g., 30 MB, 20 MB, etc.).

In some implementations, user device 140 can determine whether to send the access point data report to the server based on a random value (e.g., generated by a random number generator). The random value can be normalized into a range of values and a threshold value can be selected based on a predetermined probability or percentage. For example, the random value can be normalized into a range of values from 1 to 100, the threshold value can be 50 (e.g., resulting in a 50/50 chance that the access point data report will be sent to server 170). If the normalized random value is above 50, then the access point data report 144 (e.g., access point data report 154 for user device 150) for the current access point association will be sent to server 170 through network 160 (e.g., local area network, wide area network, the Internet, etc.). If the normalized random value is less than or equal to 50, then the access point data report 144 will not be sent to server device 170.

Randomizing the determination whether to send the access point data report causes user device 140 to unpredictably send access point data reports to server device 170 which prevents devices other than user device 140 from tracking the movements and/or behavior of user device 140 because any device attempting to track user device 140 will have less than a complete set of data with which to work. Further, since server device 170 is receiving access point data reports from a multitude of devices (e.g., user device 140, user device 150, and potentially millions more), server device 170 still receives enough information to reconstruct network topologies, access point locations, and other access point and network data even though the transmission of access point data reports is randomized at individual devices.

In some implementations, system 100 can include server device 170. For example, server device 170 can be a computing device configured to aggregate (e.g., combine, average, etc.) access point data reports received from many different user devices to construct, reconstruct, or determine network topologies and generate access point data that can be used to generate access point and/or network recommendations for end user devices, validate map data, and other various uses as may be described herein.

In some implementations, server device 170 can include intake module 172. For example, intake module 172 can preprocess access point data reports (e.g., access point data report 144, access point data report 154, etc.) received by server device 170 from many different user devices (e.g., user device 140, user device 150).

In some implementations, intake module 172 can discard unreliable access point data reports. By discarding unreliable access point data reports, server device 170 can avoid providing access point data and/or access point data recommendations for access points that may be malicious or otherwise not trustworthy.

In some implementations, intake module 172 can determine that an access point data report is unreliable when the report is regarding a connected access point built by a suspicious or unknown manufacturer. For example, intake module 172 can determine that an access point data report is unreliable when the report is regarding a connected access point built by a manufacturer that has not been approved or vetted by a trusted agency. For example, intake module 172 can receive and/or store a list of approved or vetted access points from the trusted agency. Intake module 172 can obtain the access point identifier for the connected access point from the access point data report. Intake module 172 can analyze the access point identifier to determine an identifier for the manufacturer of the connected access point. Intake module 172 can then compare the determined manufacturer identifier to the list of approved manufacturers obtained from the trusted agency. If the determine manufacturer identifier is not on the list of approved manufacturers, then intake module 172 can discard the access point data report.

In some implementations, intake module 172 can determine that an access point data report is unreliable when the report is regarding a locally administered network. The locally administered network can be identified based on the access point attributes (e.g., a flag or value that indicates the connected access point is part of a locally administered network) delivered in the access point data report. For example, a locally administered network may be one where the access point identifiers are managed and/or configured by a local administrator. Thus, the access point identifiers may change over time. This may indicate an unreliable or malicious network that should not be recommended to end users. Or, this may indicate a network that is generally not available for public use and therefore should not be recommended to end users. In either case, intake module 172 can discard access point data reports regarding a connected access point that is part of a locally administered network.

In some implementations, intake module 172 can determine that an access point data report is unreliable when the report includes an invalid user device location. For example, intake module 172 may have access to data that defines restricted areas for which access point data should not be collected. If the reported location in the access point data report is within a restricted area, then intake module 172 can discard the access point data report. As another example, intake module 172 may determine that the location is invalid when the format of the location data is incorrect, the precision of the location data is too great or too small, or the estimated error for the determined location is too great. When the user device location reported in the access point data report is invalid, intake module 172 can discard (e.g., delete) the access point data report.

In some implementations, intake module 172 can filter out access point data reports associated with moving access points. For example, intake module 172 can determine that a connected access point referenced in an access point data report is a moving access point based on the moving access point flag in the access point data report. For example, the user device (e.g., user device 140) can determine that the connected access point is moving if the user device moves over a distance larger than some threshold distance while still remaining connected to the access point. The user device can then set the moving access point flag to "true" in the access point data report. Alternatively, intake module 172 can compare the connected access point identifier in the access point data report to the access point identifiers in moving access point database 188. If the connected access point identifier is found in the moving access point database 188, then intake module 172 can determine that the connected access point is a moving access point. As another example, intake module 172 can compare the connected access point identifier in the access point data report to the access point identifiers in static access point database 186. If the connected access point identifier is found in static access point database 186 and the location of the access point in the static access point database 182 and the location of the user device in the access point data report are different, then the connected access point identified in the access point data report can be identified as a moving access point. In any case, intake module 172 can store the access point data reports associated with moving access point in moving access point reports database 180 and store the access point data reports associated with static (e.g., not moving) access points in static access point reports database 182.

In some implementations, server device 170 can include report aggregation module 173. For example, report aggregation module 173 can aggregate, average, determine minimums, maximums, or otherwise combine access point attribute values received in various access point data reports to generate, or update, access point records in static access point database 186 or to generate, or update, access point records in moving access point database 188. For example, records for each reported access point stored in database 186 and/or database 188 can include data fields corresponding to the access point attributes in the received access point data reports. However, the values for the attributes stored in database 186 and/or 188 can be an aggregate, average, determine minimums, maximums, or other combination of the access point attribute values received in the access point data reports and stored in moving access point data reports database 180 or static access reports database 182. The records in static access point database 186 and moving access point database 188 can be the definitive records (e.g., the result of processing the access point data received in the reports) for the reported access points in that the records in static access point database 186 and moving access point database 188 can be used to make access point and/or network recommendations, generate quality scores for access points, configure user devices, and/or perform other functions as described herein.

In some implementations, report aggregation module 173 can select a sampling of access point data reports for generating the access point records in static access point database 186 and/or moving access point database 188. For example, report aggregation module 173 (also access point location module 174, clustering module 176, etc.) may be configured to analyze all received access point data reports when generating the data stored in static access point database 186 and moving access point database 188. However, to increase the speed and efficiency with which the aggregate access point data (e.g., access point attributes) can be generated for the records in static access point database 186 and moving access point database 188, report aggregation module 173 (also access point location module 174, clustering module 176, etc.) can use a sampling (e.g., less than all) of the access point data reports when generating the access point records stored in database 186 and/or 188. For example, report aggregation module 173 can take a random sampling of a percentage (e.g., 80%, 60%, 75%, etc.) of the access point data reports received over a previous time period (e.g., the last 3 months, the last 2 months, the last 6 weeks, etc.). From this set of sampled access point data reports, report aggregation module 173 can select, for each reported access point, a number (e.g., 50, 40, 37, etc.) of the most recent access point data reports. From the selection of reports for a particular access point, report aggregation module 173 can generate the (e.g., aggregated, combined, merged, etc.) access point attributes stored in static access point database 186 or moving access point database 188 for the particular access point, as described further below.

In some implementations, report aggregation module 173 can combine reported access point attribute values corresponding to a particular access point. For example, when aggregating access point attributes from various access point data reports for a particular access point, report aggregation module 173 can determine average, maximum, or minimum values of the reported attributes values and store the determined values in the access point record for the particular access point in static access point database 186 or moving access point database 188. As one example, report aggregation module 173 can average, determine minimum, and/or maximum attribute values related to received signal strength, network traffic, round-trip delay times, error counter values, and/or any other attributes.

As another example, when aggregating access point attributes from various access point data reports for a particular access point, report aggregation module 173 can use the latest reported value of an attribute. For example, the network configuration (e.g., authentication type, captive configuration, etc.) of an access point may change over time. Thus, the most recent configuration detected and reported may also be the most relevant or accurate. Therefore, report aggregation module 173 may update an attribute value in the record for the particular access point in database 186 or database 188 to reflect the most recently reported value for the attribute.

In some implementations, report aggregation module 173 can count the number of reports received for connected access points. For example, while analyzing and aggregating access point data reports, report aggregation module 173 can determine or count how many reports were received for each connected access point. For example, to get a good representation of the current popularity of an access point, report aggregation module 173 can limit the count to a previous period of time (e.g., the last 28 days, the last 3 months, etc.). After generating the count for an access point, report aggregation module 173 can store the count as an attribute of the access point in the appropriate access point record in static access point database 186 or moving access point database 188.

As another example, when aggregating access point attributes from various access point data reports for a particular access point, report aggregation module 173 can obtain a location estimate from access point location module 174. For example, report aggregation module 173 can invoke access point location module 174 to calculate an estimate of the location of each access point based on the reported locations of user devices that connected to the access points. Access point location module 174 can estimate the location of access points based on all of the access point data reports or based on a sampling of access point data reports, as described above.

In some implementations, server device 170 can include access point location module 174. For example, since the locations identified in access point data reports are user device locations determined when the reporting user devices are connected with the access points that are the subject of the access point data reports and not the actual or estimated locations of the access points, access point location module 174 can estimate the locations of reported access points based on the reported locations of the user devices, as illustrated by FIG. 2.

Figure 2:
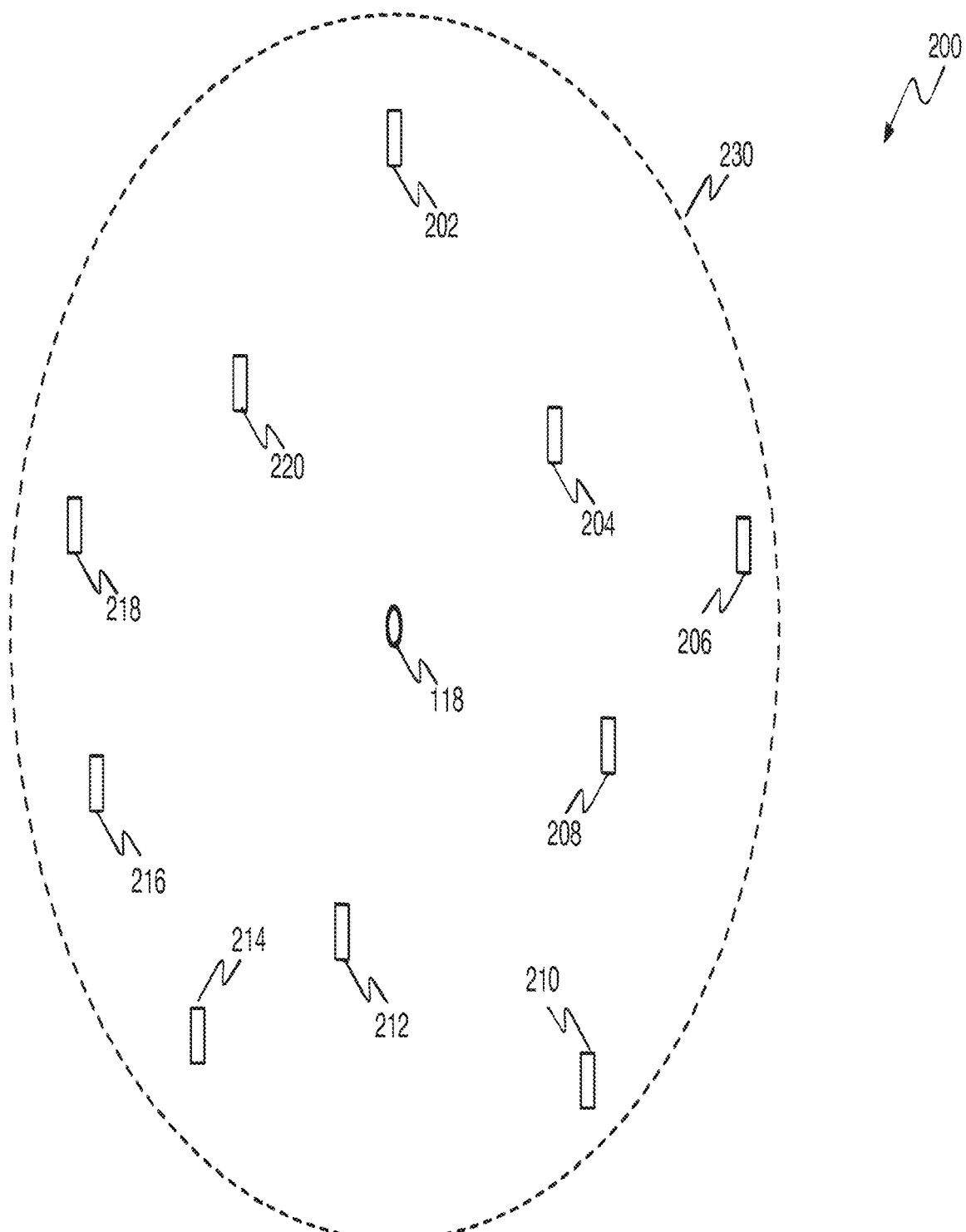
FIG. 2 is an illustration describing estimating a location of a static access point based on the reported locations of multiple user devices when connected to the access point.

FIG. 2 is an illustration 200 describing estimating a location of a static access point based on the reported locations of multiple user devices when connected to the access point. For example, user devices 202-220 (e.g., similarly configured as user device 140 and/or 150) can, at various times, establish connections with access point 118. When each user device 202-220 establishes a connection that meet the reporting criteria described above, each user device 202-220 can report its location (as illustrated by rectangles 202-220) while connected to access point 118 in an access point data report, as described above. Intake module 172 can store the access point data reports for static access points in static access point reports database 182. Access point location module 174 can estimate the locations of the reported access points based on the user device locations included in the reports stored in static access point reports database 182. For example, since the range of the wireless signal transmitted by access point 118 is generally equidistant in all directions, the range can define the radius of a circle 230 with access point 118 in the center that circumscribes a geographic within which a connection to access point 118 can be established. Further, given a number of access point data reports with respect to access point 118, the user device locations in the access point data reports corresponding to access point 118 will fall within the area of the circle 230 and, taken together, may roughly be distributed over the area of circle 230. Thus, to estimate the location of a particular access point (e.g., access point 118), access point location module 174 can calculate the centroid of all reported user device locations (e.g., locations of user devices 202-220) in access point data reports reporting a connection to the particular access point. After the location for the access point is estimated, access point location module 174 can store the estimated access point location in the record corresponding to the particular access point in static access point database 186.

In some implementations, access point location module 174 can determine a geographic region for moving access points. For example, since moving access points move across a large area (e.g., access points provide by airplanes move great distances), access point location module 174 cannot estimate a single, static location for the moving access point. Instead, access point location module 174 can analyze the reported user device locations associated with the moving access points to determine or estimate a geographic area over which the moving access point moves and store the geographic area location in the record corresponding to the access point in moving access point database 188. By analyzing the locations of the reported access point and determining that the reported user device locations associated with the access point data reports cover a large geographic area, access point location module 174 can identify moving access points and cause the moving access point data to be stored in moving access point database 188.

In some implementations, access point location module 174 can generate access point location entries in access point tile database 184. For example, access point tile database 184 can store tables, records, and/or other data structures that represent map tiles. A map tile can be a data structure that represents or corresponds to a geographical area (e.g., a square mile, a square kilometer, 100 square miles, etc.). The size of a map tile can vary based on the amount of data associated with the map tile. For example, map tiles can be configured or normalized to include a maximum amount of data (e.g., 1 GB, 50 MB, etc.). Thus, the more data that is associated with a geographical area, the smaller the map tiles will be that cover the geographic area. For example, a dense metropolitan area may generate a large amount of data in a small geographic area. Thus, server device 170 may create and store many map tiles that each cover a very small geographic area for managing the data even though the metropolitan area is small. In contrast, a rural region (e.g., farmland, desert, mountain regions, etc.) may generate very little data over a large area. Thus, server device 170 may create a single map tile that covers a very large area for managing the data even though the rural area is very large. Server device 170 may generate map tiles that cover a region, country, and/or the entire planet. When a user device requests data (e.g., in this case access point data), the server device 170 can use the map tiles to determine what data to send to the user device based on, for example, the current location of the user device, as described further below.

In some implementations, access point location module 174 can associate access points with map tiles in access point tile database 184. For example, after access point location module 174 determines a location for a reported static access point, access point location module 174 can determine a map tile (e.g., an access point tile) in access point tile database 184 corresponding to the determined location and add an entry to the determined map tile that identifies the access point and the location of the access point. After access point location module 174 determines a geographic area for a reported moving access point, access point location module 174 can determine a map tile (e.g., an access point tile) in access point tile database 184 corresponding to the determined geographic area and add an entry to the determined map tile (or multiple tiles if needed to cover the geographic area of the moving access point) that identifies the access point and the location of the access point. When server device 170 determines that a map tile should be served to a user device, server device 170 can use the access point identification information to obtain access point data for all of the access points associated with the map tile from database 186 and/or database 188 and send the map tile along with all of the corresponding access point data to the user device.

When aggregating access point attributes from various access point data reports for a particular access point, report aggregation module 173 can obtain a network identifier for the access point from clustering module 176. For example, clustering module 176 can generate a network identifier for internally tracking access points that belong to the same network. This network identifier may be different than the actual network identifier (extended service set identifier) used by user devices for connecting to the network since the actual network identifier is not reported by user devices for privacy reasons described herein.

In some implementations, report aggregation module 173 can invoke clustering module 176 to determine, generate, recreate, construct, or reconstruct, networks and/or network topologies based on the related access points identified in the access point data reports. Referring to FIG. 1, for example, each user device (e.g., user device 140, user device 150, etc.) may only connect to and/or collect related access point identifiers for a subset of access points within a network environment. For example, user device 140 may connect to the network configured for network environment 130 by establishing a connection with access point 114. Given the transmission range (represented by dashed circle 142 for user device 140 and dashed circle 152 for user device 150) of the access points and/or user device 140, user device 140 may detect only related access point 116 even though there are other related access points in network environment 130. Similarly, user device 150 may connect to the network of network environment 130 through access point 118 and may detect related access points 120 and 116. Other user devices (not shown) may collect access point data for related access points 122, 124 and/or 126. When the user devices send their access point data reports to server device 170, clustering module can use the access point relationships to cluster the access points and reconstruct the network of network environment 130 even though each user device only reported a portion (e.g., less than all) of the access points in network environment 130.

Figure 3:
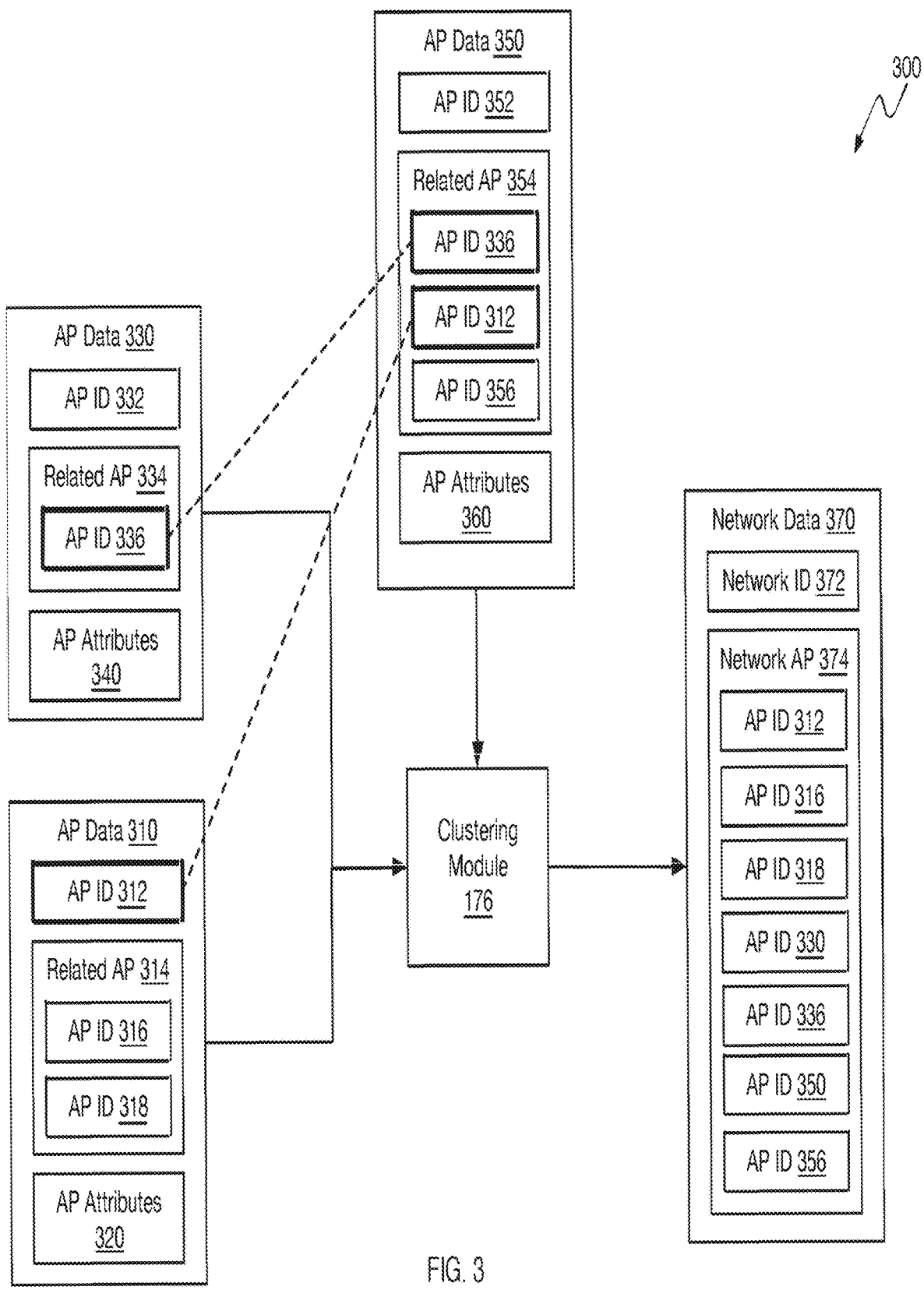
FIG. 3 is an illustration for clustering access point data reports to determine access points associated with the same network.

FIG. 3 is an illustration 300 for clustering access point data reports. Illustration 300 includes access point data reports 310, 330, and 350. As described above, each access point data report includes an identifier (e.g., access point identifier 312, 332, 352, etc.) for the access point to which the reporting user device connected. Each access point data report may also include a list of identifiers (related access point list 314, 334, 354, etc.) identifying related access points that are part of the same network as the identified connected access point. Each access point data report will include the access point attributes (e.g., access point attributes 320, 340, 360, etc.) collected, generated, calculated, measured, or otherwise obtained when the user devices connected to the respective access points, as may be described herein.

When invoked by report aggregation module 173, clustering module 176 can obtain the access point data reports 310, 330, 350, etc., and perform a clustering operation to determine which access points should be clustered into the same network groups. For example, clustering module 176 can obtain access point data reports 310, 330, 350, etc., from static access point data report database 182 or moving access point data reports database 180. To perform the clustering operation, clustering module 176 can iterate through the access point data reports (e.g., the entire database or a selected sampling) comparing the connected access point identifiers and related access point identifiers to determine which identifiers are related to the same network. For example, access point data report 310 indicates that access point data identifiers 312, 316, and 318 are associated with the same network. Access point data report 350 indicates that access point identifiers 352, 336, 312, and 356 are associated with the same network. Since access point identifier 312 is in both networks, clustering module 176 can determine that access point data report 310 and access point data report 350 should be clustered into a network group and that access point identifiers 312, 316, 318, 352, 336, and 356 correspond to access points in the same network. Similarly, access point data report 330 indicates that access point identifiers 332 and 336 are part of the same network. Since access point identifier 336 is in same network as access point identifier 352 as indicated by access point data report 350, clustering module 176 can determine that access point data report 330 and access point data report 350 should be clustered into a network group 370 (e.g., that also includes access point data report 310) and that access point identifiers 312, 316, 318, 332, 352, 336, and 356 correspond to access points in the same network. Clustering module 176 can generate and assign a network identifier for the clustered network group, and each access point within the network group of access points, so that the relationship between access points and the access point attributes can be tracked, managed, and or analyzed to provide various services (e.g., map data validation and/or correction), as may be described herein. For example, the network identifier can be stored in the access point records associated with access point identifiers 312, 316, 318, 332, 352, 336, and 356 in database 186 and/or 188.

In some implementations, server device 170 can include scoring module 178. For example, scoring module 178 can be configured to generate quality scores for access points based on the access point data (e.g., access point attributes) associated with the reported access points. Scoring module 178 can generate the access point quality scores based on the access point data stored in static access point database 186 and/or moving access point database 188, for example.

In some implementations, scoring module 178 can generate quality scores for access points based on the popularity of the access point. For example, scoring module 178 can generate a quality score for a particular access point based on the number of access point reports received for the particular access point. Stated differently, scoring module 178 can generate a quality score for a particular access point based on the number of times user devices have connected to the particular access point as determined based on the number of access point data reports received that identify the particular access point as the connected access point.

In some implementations, the popularity quality score can be generated by comparing the relative popularity of all of the reported access points. For example, scoring module 178 can determine a range of connection (e.g., report) counts for the reported access points. The connection counts for all of the reported access points can be normalized over a range of quality scores (e.g., 1-100) so that user devices that receive the quality scores for individual access points can quickly determine high quality access points (e.g., having the highest scores) and low quality access points (e.g., having the lowest scores) from the scores associated with the access points.

In some implementations, scoring module 178 can generate quality scores for access points based on network and/or access point quality attributes. For example, network metrics, or measurements, such as bandwidth, error counters, RSSI (received signal strength indicator), data traffic rates, round trip delay time, and/or other network statistics reported in access point data reports and stored in database 186 or 188 can be used to generate a quality score for an access point. For example, high bandwidth, high RSSI, low error counters, high data traffic rates, low round trip delay time, etc., can all contribute to increasing or improving the score for an access point. Low bandwidth, low RSSI, high error counters, low data traffic rates, high round trip delay time, etc., can all contribute to decreasing or reducing the score for an access point. For example, the access point quality scores generated based on the reported network statistics can be generated by calculating a weighted average. An attribute score can be generated for each access point attribute (e.g., error counter, round trip delay time, network traffic, etc.) based on the reported network statistic. Each attribute score can be weighted based on the attribute's importance (e.g., error counts may be important, network traffic counts may not be important, etc.) with regard to determining network or access point quality. The weighted scores can be summed or averaged to determine the quality score for the access point. The quality scores for all of the reported access points can be normalized over a range of quality scores (e.g., 1-100) so that user devices that receive the quality scores for individual access points can quickly determine high quality access points (e.g., having the highest scores) and low quality access points (e.g., having the lowest scores) from the scores associated with the access points.

In some implementations, scoring module 178 can generate access point quality scores based on a combination of popularity and network quality statistics. For example, while high popularity may be an indication of a high-quality network (as described above), an access point that processes a high number of connections may not provide the best service to a user device when compared to an access point that has the same or similar network statistics but a lower number of connections to manage. Thus, in some implementations, scoring module 178 can generate an access point quality score based on the various network statistics described above, and adjust the network statistics-based access point quality score based on the popularity of the access point. For example, scoring module 178 can reduce the network statistics-based access point quality score for an access point when the popularity of the access point is high. Scoring module 178 can increase the network statistics-based access point quality score for an access point when the popularity of the access point is low. Thus, when two access points that have similar network statistics (e.g., belong to the same network) are scored, the access point that manages fewer connections may be scored higher than the access point that manages more connections. For example, this scoring approach may allow a user device to select or recommend the less busy access point between two or more access points on the same network, as described further below.

In some implementations, scoring module 178 can store the quality scores generate for each access point in the records for each access point. For example, after generating a quality score (e.g., popularity-based quality score, network statistic based quality score, combination thereof, etc.), scoring module 178 can store the generated quality score in the access point data record stored in static access point database 186 or moving access point database 188.

In some implementations, server device 170 can analyze reported access point data to identify malicious access points. For example, a malicious access point can be an access point configured to appear as if it is part of a particular network when, in fact, the access point is not part of the particular network. For example, the access point can be configured with a network identifier corresponding to a popular or trusted network even though the access point is not part of the popular or trusted network. This "spoofing" tactic may be used to leverage the identity of the trusted network to gain access to a user device or collect personal information from the user. Server device 170 may detect this type of malicious access point by comparing the network statistics reported for the malicious access point to the network statistics reported for other related access points (e.g., associated with the same network). If the statistics reported for the malicious access point are significantly different than the network statistics reported for related access points, then server device 170 can identify the malicious access point as a malicious access point. In some implementations, a quality score generated for the malicious access point can be used to identify malicious access points. For example, scoring module 178 generates a low quality score for one access point from a group of related access points (e.g., associated with the same network) that generally have higher quality scores, then server device 170 can identify the outlier access point having the low quality score as being (or likely to be) a malicious access point. When server device 170 identifies a malicious access point, server device 170 can store data (e.g., a flag) in the record for the malicious access point in database 186/188 indicating that the access point is malicious (or likely malicious). Thus, when the access point data is served to a user device, the user device can avoid connecting to the malicious access point based on the malicious access point data.

Figure 4:
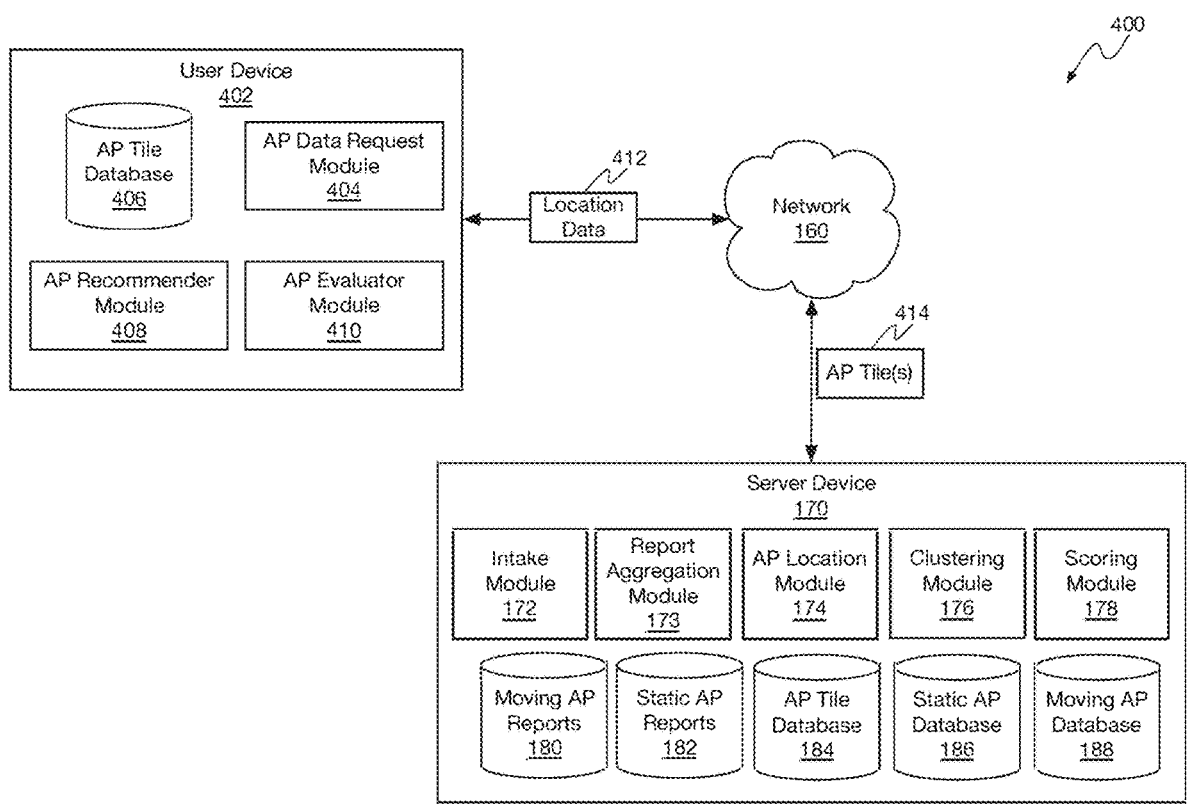
FIG. 4 is a block diagram of an example system for serving access point data to a user device based on location.

FIG. 4 is a block diagram of an example system 400 for serving access point data to a user device based on location. For example, system 400 can correspond to system 100 described above. System 400 can include user device 402. For example, user device 402 can correspond to or be configured similarly to user device 140 or user device 150 described above.

In some implementations, user device 402 can include access point data request module 404. For example, access point data request module 404 can be configured to request access point data associated with a location of user device 402 based on a context of user device 402. In particular, access point data request module 404 can request access point data from server device 170 when user device 402 is connected to an external power source (e.g. an electrical wall outlet) and/or when user device 402 is connected to a Wi-Fi access point to avoid draining the battery of user device 402 and to avoid incurring the cost of using a cellular data connection. When access point data request module 404 determines that the context is appropriate for requesting access point data, access point data request module 404 can determine the current location of user device 402 and/or most recently or frequently visited locations of user device 402. Access point data request module 404 can then send the current location and most recently/frequently visited locations to server device 170 in location data message 412.

In response to receiving location data message 412, server device 170 can identify the map tiles (e.g., access point tiles) in access point tile database 184 that correspond to the locations identified in location data message 412. For example, since each map tile in access point tile database covers a corresponding geographic area, server device 170 can compare the locations identified in location data message 412 to the geographic areas covered by the map tiles in access point tile database 184 to identify map tiles corresponding to the received location data. In some implementations, server device 170 can identify the map tiles corresponding to the received location data and nearby map tiles to increase the geographic coverage of the map tiles and the access point data delivered by server device 170 to user device 402.

In some implementations, after identifying the map tiles in response to receiving location data message 412, server device 170 can obtain access point data records (e.g., access point data attributes) for access points associated with the identified map tiles. As described above, each map tile can include data identifying access points located within the geographic area covered by each map tile. Server device 170 can use the access point identifiers in the map tiles to obtain corresponding access point data records from static access point database 186 and/or moving access point database 188.

After identifying the map tiles and corresponding access point data, server device 170 can send the map tiles, including access point data, to user device 402 in access point tile message 414. For example, the map tiles in access point tile message 414 can include all of the access point data attributes and attribute values stored in the access point data records of database 186 and/or 188.

When access point data request module 404 receives access point tile message 414, request module 404 can store the map tiles, and corresponding access point data, in access point tile database 406. For example, user device 402 can use the stored access point data to provide various functions and features as described herein above and below.

Figure 5:
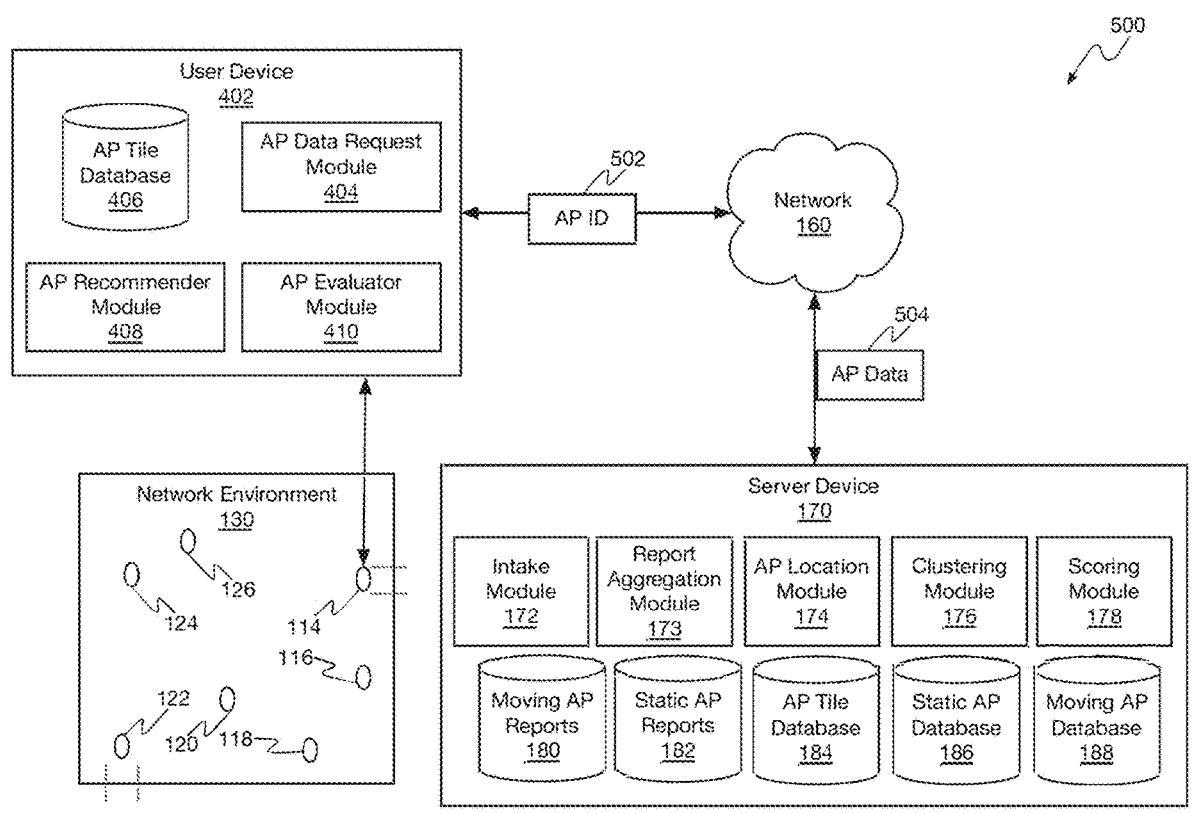
FIG. 5 is a block diagram of an example system for serving access point data to a user device based on access point identifier.

FIG. 5 is a block diagram of an example system 500 for serving access point data to a user device based on access point identifier. For example, system 500 can correspond to system 400 describe above. With reference to system 500, user device 402 may, in some instances, connect to an access point (e.g., access point 114) for which user device 402 cannot find access point data in access point tile database 406. To obtain the relevant access point data, access point data request module 404 can send an access point data request 502 to server device 170 that identifies the currently connected access point.

In response to receiving request 502, server device 170 can obtain access point data related to the access point identified in request 502. For example, server device 170 can search static access point database 186 and/or moving access point database 188 for the identified access point and all related access points (e.g., access points on the same network as the identified access point). When the access points are found, server device 170 can send the access point data associated with the identified access point (e.g., access point 114) and related access points (e.g., access point 116-126) to user device 402 in access point data message 504. Upon receipt of message 504, access point data request module 404 can store the access point data in memory on user device 402.

In some implementations, moving access point data may not be delivered to user device 402 in response to a location-based access point data request. For example, server device 170 may be configured to deliver static access point data and not moving access point data in response to a location-based access point data request. Thus, when user device 402 connects to a moving access point (e.g., an access point on an airplane, on a bus, on a train, etc.), user device 402 may request access point data from server device 170 based on the identifier of the moving access point.

Features Enabled Using Access Point Data

In some implementations, user device 402 can adjust settings of user device 402 based on access point data received from server device 170. When user device 402 receives the access point data for the moving access point, user device 402 can determine based on the received access point data (e.g., based on a flag that identifies the access point as a moving access point) that the connected access point is a moving access point. In response to determining that user device 402 is connected to a moving access point, user device 402 may automatically adjust some settings of user device 402 in order to more efficiently interact with the connected access point. For example, moving access points may not provide the same high level of network performance as static access points. Thus, when user device 402 is connected to a moving access point, user device 402 may configure itself into a low data mode that reduces the amount of data that is sent through the moving access point. For example, user device 402 can suspend background network processing or other non-critical, non-user facing networking activities while connected to the moving access point.

In some implementations, user device 402 can select access points associated with a network based on access point data received from server device 102. For example, when user device 402 is near a network of access points, user device 402 may receive signals from multiple access points within the network. Often, when the user of user device 402 provides input to join the network, user device 402 may establish a connection to the nearest access point within the network or the access point associated with the highest received signal strength indictor. However, the nearest access point may not be the best access point in the network to join. Instead of selecting the nearest access point, user device 402 can compare the quality scores for the access points that are associated with the user selected network and within range of user device 402 and select the access point that has the highest quality score. As described above, if the quality score is based on popularity, then user device 402 may select the most popular access point among the network access points within range of user device 402. However, if the quality score is based on network statistics, then user device 402 may select to connect to a high quality, albeit less popular, access point which may provide for a better networking experience for the user of user device 402 since the access point manages fewer active connections than the popular access point.

Figure 6:
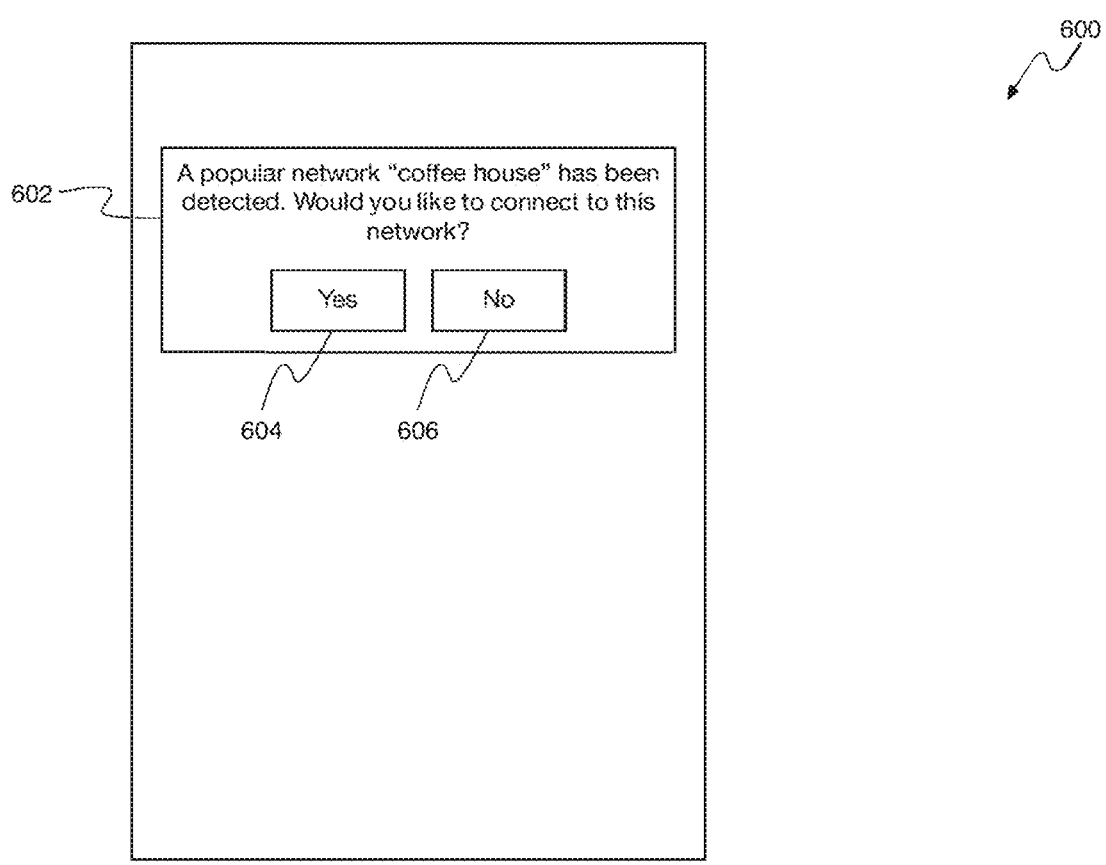
FIG. 6 is an example graphical user interface for presenting a popular access point suggestion.

FIG. 6 is an example graphical user interface 600 for presenting a popular access point suggestion. For example, graphical user interface (GUI) 600 can be presented by user device 402 in response to detecting a popular network access point within range of user device 402. For example, as user device 402 moves from location to location, user device 402 may receive or detect wireless access point signals that identify various access points within range of user device 402. User device 402 can compare the identifiers of the detected access points to the access point identifiers in access point tile database 406 and obtain quality scores for the detected access point identifiers. When the quality scores are based on access point popularity, the scores can be used to identify the most popular access points among the detected access points. In this case, popularity can serve as a proxy for quality based on the assumption that low quality access points would not be very popular. When user device 402 detects a popular access point (e.g., an access point having a popularity score/quality score above a threshold value), then user device 402 can present GUI 600 to inform the user about the popular access point. For example, GUI 600 can present a notification 602 informing the user of the name of the popular access point/network and prompting the user to connect to the popular access point. The user can provide input to graphical object 604 to cause user device 402 join the network. The user can provide input to graphical object 606 to dismiss notification 602.

Figure 7:
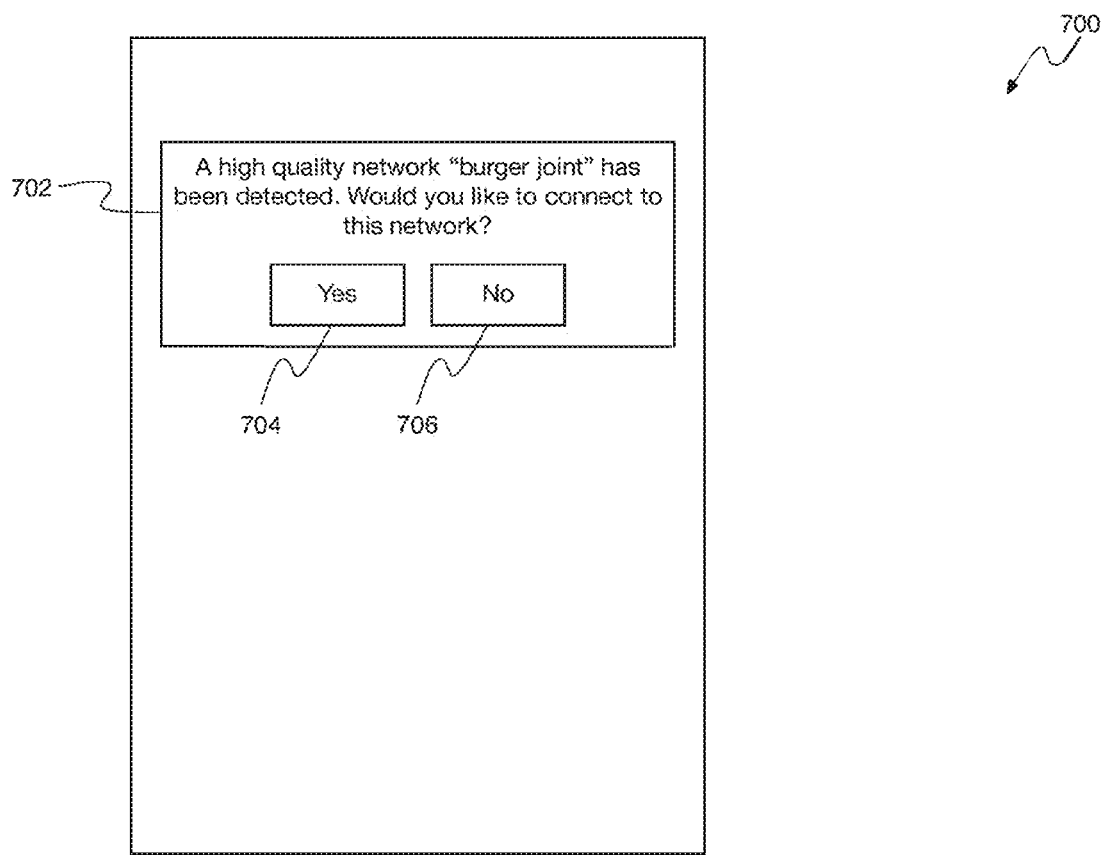
FIG. 7 is an example graphical user interface for presenting a high-quality access point suggestion.

FIG. 7 is an example graphical user interface 700 for presenting a high-quality access point suggestion. For example, graphical user interface (GUI) 700 can be presented by user device 402 in response to detecting a high-quality network access point within range of user device 402. For example, as user device 402 moves from location to location, user device 402 may receive or detect wireless access point signals that identify various access points (e.g., networks) within range of user device 402. User device 402 can compare the identifiers of the detected access points to the access point identifiers in access point tile database 406 and obtain quality scores for the detected access point identifiers. When the quality scores are based on network statistics associated with the detected access points, the scores can be used to identify the highest quality access points among the detected access points. When user device 402 detects a high-quality access point (e.g., an access point having a quality score above a threshold value), then user device 402 can present GUI 700 to inform the user about the high-quality access point. For example, GUI 700 can present a notification 702 informing the user of the name of the high-quality access point/network and prompting the user to connect to the high-quality access point. The user can provide input to graphical object 604 to cause user device 402 join the network. The user can provide input to graphical object 606 to dismiss notification 602.

In some implementations, the access point suggestion notifications of FIG. 6 and FIG. 7 may be presented in response to the user expressing intent to use a networking feature of user device 402. For example, as user device 402 moves from location to location, user device 402 may not be connected to a wireless access point and may use a cellular data connection for light networking tasks. In this situation, user device 402 may not evaluate the scores of detectable access points and may not present access point suggestions to the user. However, while not connected to a wireless access point, the user may invoke an application or feature of user device 402 that requires access to a network (e.g., the Internet) thereby expressing the user's intent to use networking. In response to detecting the user's intent to use networking, user device 402 may detect access points within range of user device 402 and evaluate the quality scores of the access points to generate and present access point suggestions, as described above with reference to FIG. 6 and FIG. 7.

Figure 8:
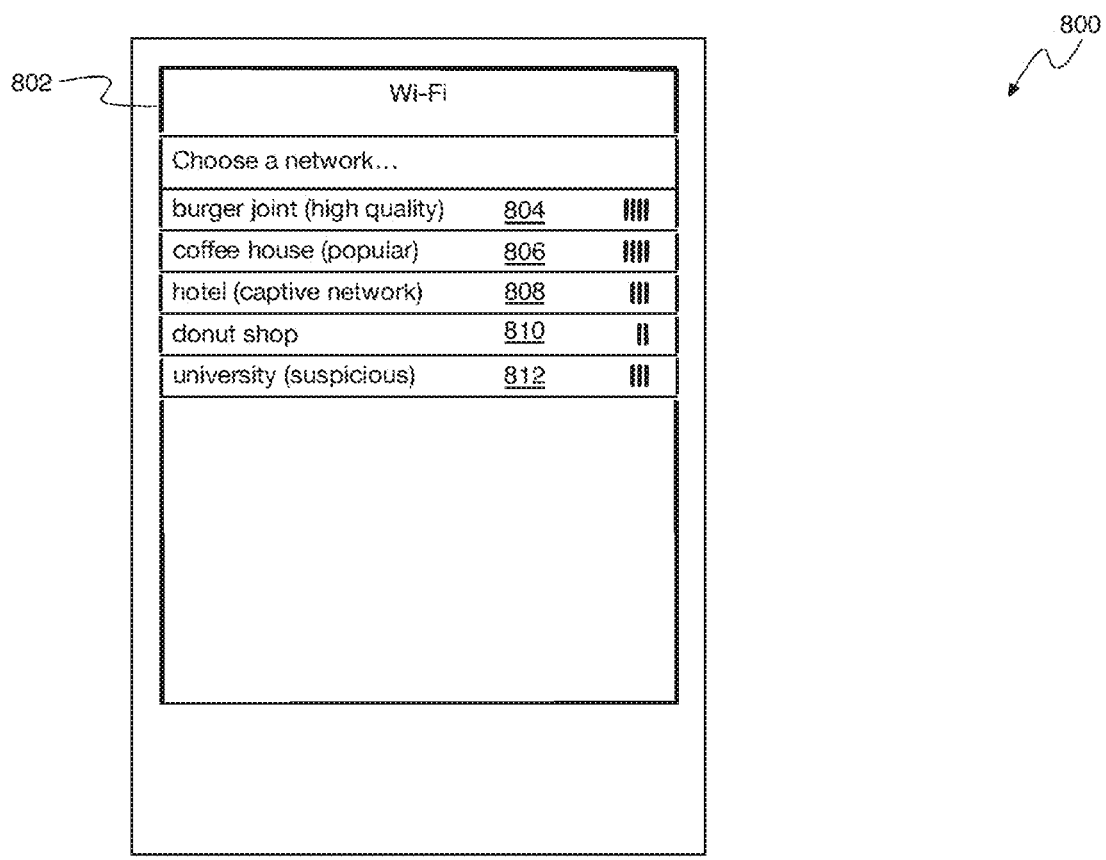
FIG. 8 is an example graphical user interface for presenting access points for selection by the user.

FIG. 8 is an example graphical user interface 800 for presenting access points for selection by the user. For example, graphical user interface 800 can be presented by user device 402 in response to receiving user input indicating that the user would like to select a wireless network for networking with user device 402. For example, user device 402 may not be currently connected to a wireless access point and the user may provide input to user device 402 indicating that the user would like to select a wireless network for user device 402 to join. In response to receiving this user input, user device 402 can present GUI 800.

In some implementations, GUI 800 can include graphical object 802 that presents a list of network access points within range of user device 402. Each network access point 804-812 can be represented by the network identifier (e.g. network name) configured for the network and received from the detected wireless access point. In some implementations, user device 402 can sort the list of network access points 804-812 based on their respective quality scores stored in access point tile database 406. For example, GUI 800 can present high-quality access points at the top of the list on GUI 800 and present low-quality access points at the bottom of the list.

In some implementations, GUI 800 can include access point attributes for each detected network access point. For example, a received signal strength indicator can be presented for each network access point 804-812 indicating the current received signal strength.

In some implementations, the access point attributes presented for the access points 804-812 can include attributes obtained from the access point data stored in access point tile database 406. For example, user device 402 can use the access point identifiers received from the detected access points to lookup attributes of the detected access points in access point tile database 406. Thus, when user device 402 determines that access point 804 has a corresponding quality score indicating that access point 804 is a high-quality access point, GUI 800 can present an indication that access point 804 is a high-quality access point. When user device 402 determines that access point 806 has a corresponding popularity score indicating that access point 806 is a popular access point, GUI 800 can present an indication that access point 806 is a popular access point. When user device 402 determines that access point 808 has attributes indicating that access point 808 is associated with a captive access point or network, GUI 800 can present an indication that access point 808 is a captive access point. When user device 402 determines that access point 812 has attributes indicating that access point 812 is a malicious access point or network, GUI 800 can present an indication that access point 812 is suspicious or malicious. However, in some instances, user device 402 may be configured to prevent suspicious or malicious access points from being presented on GUI 800. By presenting the additional access point attribute information, user device 402 enables the user to more efficiently make more intelligent decisions about which access points and/or networks to join with user device 402. By presenting information identifying low quality access points, captive networks, and/or suspicious networks, some of the frustration often experienced by users when selecting networks for network computing can be avoided.

In some implementations, the access point data stored in access point tile database 406 can include multiple quality scores for each access point. For example, server device 170 may generate and user device 402 may receive both popularity scores and quality scores for each access point. User device 402 can then be configured to use one or both of the scores when generating access point recommendations.

In some implementations, the access point data for each access point may include histograms of time-based scores. For example, the quality/popularity scores generated for access points may be dependent on the time of day during which information about the access point is collected. For example, an access point that has good network statistics may be required to manage a great number of connections around midday, while the same access point may be required to manage fewer connections in the evening. Thus, around midday, the quality score for the access point may be lower than the quality score generated for the same access point in the evening. Moreover, network statistics for an access point may fluctuate throughout the day based on the number of connections managed by the network, the amount of data transmitted through the network, and various other factors. Thus, the fluctuations in network statistics may result in different quality scores being generated for the same access point at different times throughout the day. When making access point suggestions or presenting access point attributes, user device 402 can determine the current time and obtain the access point quality scores corresponding to the current time from the histogram of quality scores generated for the detected access points.

In some implementations, user device 402 can make access point recommendations based on the capabilities of user device 402. For example, access point data stored in access point tile database 406 can include network configuration data for the network associated with the access point. The network configuration data can identify security type/ authentication type information for the access points, physical layer protocols for the access points, as well as other network configuration information. User device 402 can compare the network configuration attributes for detected access points to the capabilities of user device 402 and only recommend access points/networks compatible with capabilities of user device 402. For example, when a detected high-quality access point uses an authentication type not supported by user device 402, user device 402 will not recommend the detected high-quality access point. When a detected high-quality access point uses a physical layer protocol (e.g., 802.11ac, 802.11n, or other Wi-Fi protocol) not supported by user device 402, user device 402 will not recommend the detected high-quality access point.

Figure 9:
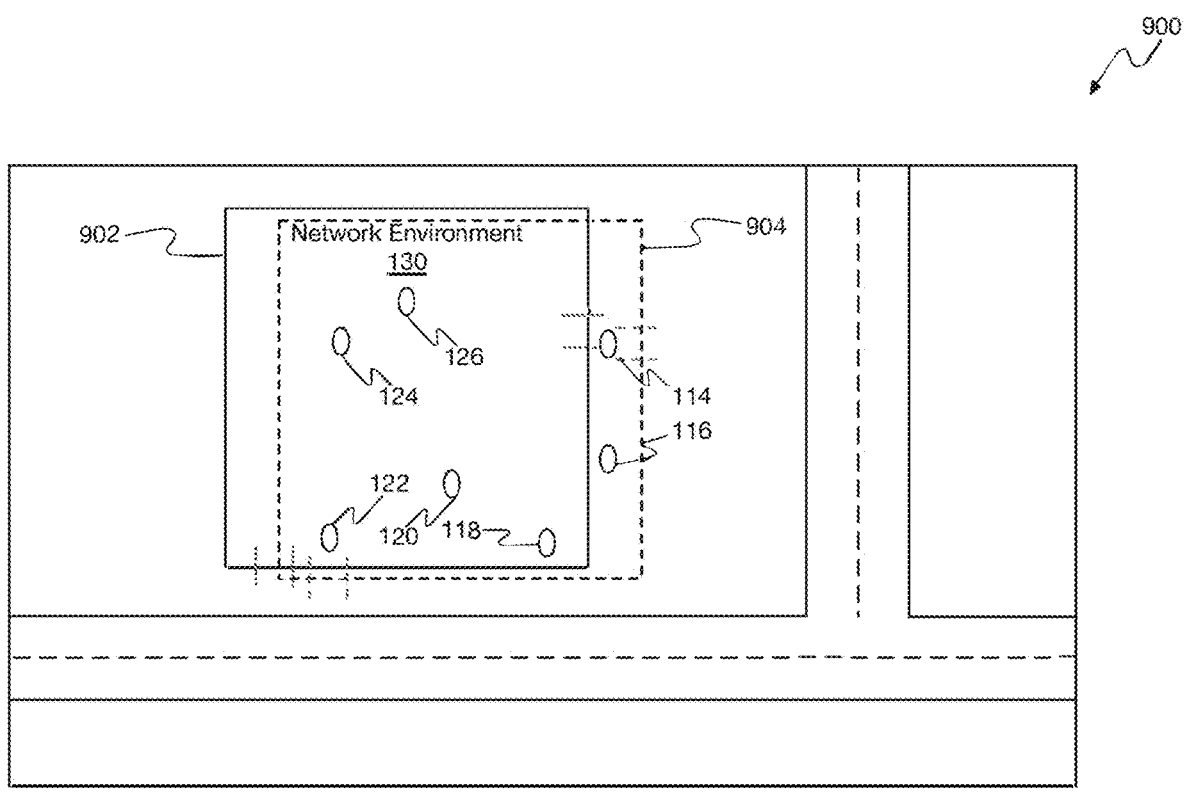
FIG. 9 is an example graphical user interface for validating map data based on estimated access point location data.

FIG. 9 is an example graphical user interface 900 for validating map data based on estimated access point location data. For example, GUI 900 can be presented by user device 402 as part of a map data administration application running on user device 402. A map data administrator can use GUI 900 to confirm the accuracy of map data and/or identify errors in a current instance of map data.

In some implementations, access point data (e.g., access point location data in particular) received from server device 170 can be used by user device 402 to validate map data, place map labels, and/or suggest corrections to map data. For example, user device 402 can obtain map data (e.g., map tiles including data defining roads, buildings, points of interest, etc.) from a map data server. User device 402 can obtain access point tiles from server device 170.

In some implementations, user device 402 can analyze the map data in view of the access point data to identify map data errors. For example, networks (e.g., related access points) are typically located with respect to some physical structure (e.g. office building, campus, home, etc.). The map data received by user device 402 can define the physical shape, area, and location of such structures. The access point data can include information identifying the location of the access points within a network. User device 402 can compare the location of a physical structure to the location of access points within a network to determine which access point networks are associated with which physical structures. Referring to GUI 900, user device 402 can identify related access points 114-126 as belonging to the same network corresponding to network environment 130. User device 402 can obtain map data that defines the location and shape of building 902. User device 402 can determine that some of the access points 114-126 are within or near building 902 by comparing the locations of the access points to the location information associated with building 902. Based on this determination, user device 402 can determine that network environment 130 (e.g., the network corresponding to access points 114-126) corresponds to building 902.

In some implementations, user device 402 can use the access point location information to identify location errors regarding physical structures in map data. For example, after determining that network environment 130 corresponds to building 902, user device 402 can determine that some of the access points (e.g., access points 114, access points 116, etc.) within network environment 130 are located outside of the map data location (e.g., geographic area) of building 902. In response to identifying the access points that are located outside of building 902, user device 402 can present on GUI 900 an indication that there might be an error in the map data with respect to the location of building 902. For example, GUI 900 can include a map view that includes building 902 and access points 114-126 at their respective locations on a map. When user device 402 determines that there may be an error with respect to the location of building 902, user device 402 can present an indication 904 that the building location may be incorrect. For example, user device 402 can present an indication 904 suggesting a corrected location for building 902 that fully includes the access points of the network environment 130 associated with building 902. In response to viewing indication 902, the user of user device 402 can initiate a process to correct the location of building 902 in the corresponding map data. In some implementations, user device 904 can automatically submit a map data correction request to an appropriate map server suggesting the corrected location as represented by indication 904.

In some implementations, the map data error detection and correction described above with respect to the locations of physical structures in map data can be performed automatically by the map data server based on access point data obtained from server device 170. For example, the map data server can obtain access point location information from server device 170, compare locations of networks (e.g., access points) to locations of corresponding structures, identify errors in structure locations in map data based on the comparison, and automatically adjust the locations of the structures so that the structures fully encompass the access points associated with corresponding access points.

In some implementations, access point data can be analyzed to determine or correct the locations of map labels. For example, map views typically include map labels that identify physical structures represented on a map view and/or features of physical structures, such as entrances, exits, etc. Thus, map labels are typically placed in the center of corresponding physical structures or at entrances/exits to corresponding physical structures. As described above, access points corresponding to a network environment are typically located within a corresponding physical structure (e.g., building, campus, etc.). Thus, the centroid of the locations of all access points within a network environment may provide a good estimate of the center of the corresponding physical structure. This centroid location can be used (e.g. by user device 402 or a map server) to determine a location for, or correct the location of, a map label that describes the corresponding physical structure. This centroid location can be presented on a map view (e.g., GUI 900) to suggest a location for a map label to a user administrator who may cause a change to the corresponding map data that defines the location for label placement.

In some implementations, an access point location can be used as a map label location. For example, server device 170 can determine that a reported access point is associated with an entrance of a building. For example, access point data reports received by server device 170 can identify an access point as an edge access point (e.g., on the periphery of a network). Server device 170 can determine the most popular edge access point based on the number of access point data reports received, as described above. Server device 170 can determine or estimate that the most popular edge access point corresponds to an entrance/exit of a corresponding physical structure and add an attribute value to the access point data for the most popular edge access point indicating that the access point corresponds to an entrance. A map server or user device 402 can use the access point data identifying entrance access points and the locations of entrance access points to determine locations of entrances of physical structures and place entrance/exit map labels at the entrances of the physical structures.

Figure 10:
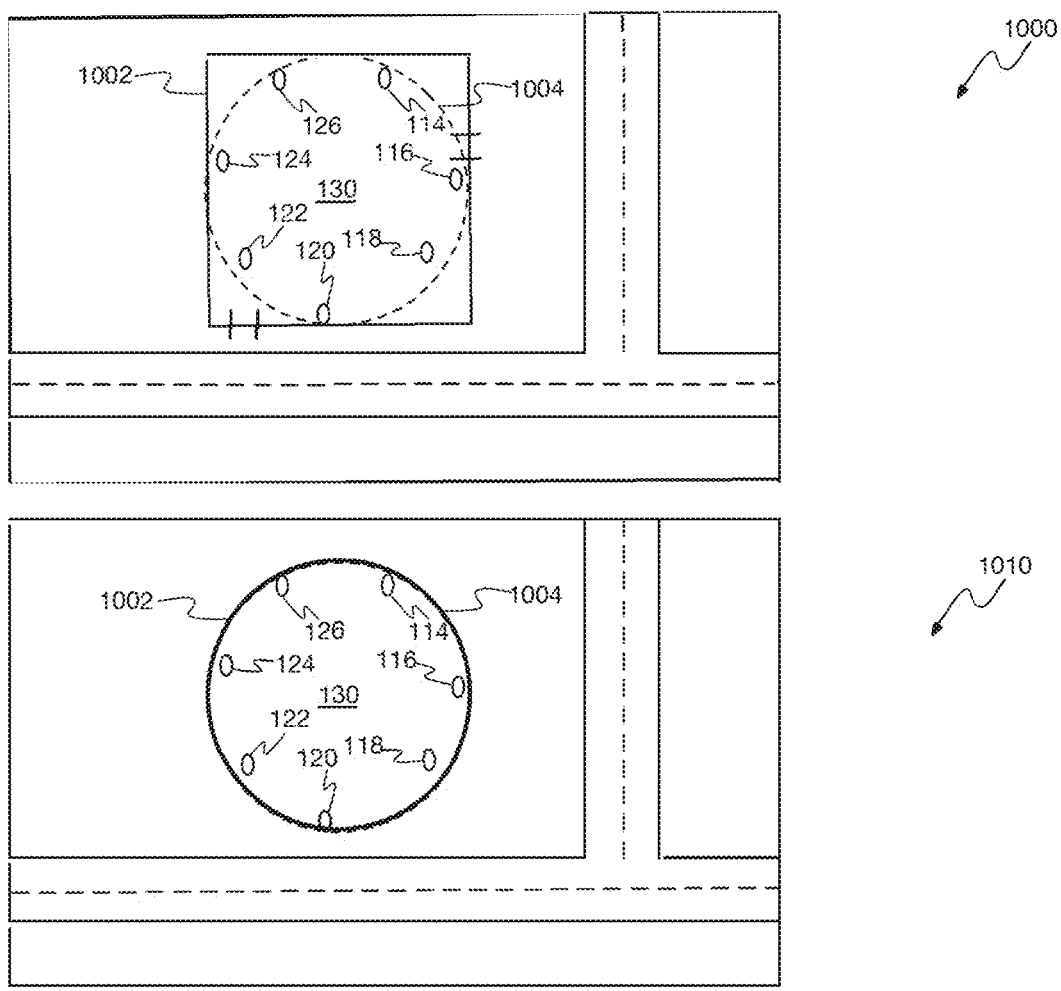
FIG. 10 is an example graphical user interface for determining the shapes of structures based on estimated access point location data.

FIG. 10 illustrates example graphical user interfaces 1000 and 1010 for determining the shapes of structures based on estimated access point location data. For example, GUI 1000 can be presented by user device 402 as part of a map data administration application running on user device 402. A map data administrator can use GUI 1000 to confirm the accuracy of map data and/or identify errors in a current instance of map data. For example, user device 402, or server device 170, can determine a recommended shape of a structure (e.g., building, park, campus, city, etc.) based on the estimated access point locations (e.g., related access points 114-126) for a network environment (e.g., network environment 130) and suggest a structure shape for a corresponding structure based on the shape of the network environment.

In some implementations, access point data (e.g., access point location data in particular) received from server device 170 can be used by user device 402 to validate map data pertaining to the shapes of structures and/or suggest corrections to the map data. For example, user device 402 can obtain map data (e.g., map tiles including data defining roads, buildings, points of interest, etc.) from a map data server. User device 402 can obtain access point tiles from server device 170.

In some implementations, user device 402 can analyze the map data in view of the access point data to identify map data errors related to the shapes of structures described by the map data. For example, networks (e.g., related access points) are typically located with respect to some physical structure (e.g. office building, campus, home, etc.). The map data received by user device 402 can define the physical shape, area, and location of such structures. The access point data can include information identifying the location of the access points (e.g., related access points 114-126) within a network. User device 402 can compare the location of a physical structure to the location of access points within a network to determine which access point networks are associated with which physical structures. Referring to GUI 1000, user device 402 can identify related access points (e.g., related access points 114-126) as belonging to the same network corresponding to network environment 130. User device 402 can obtain map data that defines the location and shape of a corresponding building (e.g. building 1002). User device 402 can determine that some of the access points 114-126 are within the building by comparing the locations of the access points to the location information associated with the building. Based on this determination, user device 402 can determine that network environment 130 corresponds to building 1002.

In some implementations, user device 402 can use the access point location information to identify errors regarding the shapes of physical structures in map data. For example, after determining that network environment 130 corresponds to building 902, user device 402 can determine that the locations of access points (e.g., related access points 114-126) within network environment 130 when taken together as a whole conform to, or imitate, a particular shape (e.g., rectangle, square, circle, oval, etc.). In the example if FIG. 10, the network environment 130 conforms to the shape of a circle (e.g., network shape 1004). User device 402 can compare network shape 1004 to the shape defined for the building in the map data to determine if there is an error regarding the shape of the building. For example, user device 402 can determine that there is an error when the building shape and the network shape are not the same or do not meet a threshold level of similarity. In response to identifying an error regarding the shape of the building, user device 402 can present on GUI 1000 an indication that there might be an error in the map data with respect to the shape of the building. For example, GUI 1002 can include a map view that includes building 1002 and access points 114-126 at their respective locations on a map. When user device 402 determines that there may be an error with respect to the shape of building 902, user device 402 can present network shape 1004 as an indication that the building shape may be incorrect. For example, user device 402 can present a network shape 1004 as a suggestion for a correct shape for building 1002. In response to viewing network shape 1004, the user of user device 402 can initiate a process to correct the shape of building 1002 in the corresponding map data. In some implementations, user device 402 can automatically submit a map data correction request to an appropriate map server suggesting that the shape of the building in the map data be corrected to correspond to network shape 1004, as represented by indication 1004. When corrected in the map data, the shape of the building 1002 may be similar to network shape 1004, as illustrated in GUI 1010. Thus, the locations of related access points can be used to determine and/or correct the shapes of physical structures represented in map data.

In some implementations, the map data error detection and correction described above with respect to the locations of physical structures in map data can be performed automatically by the map data server based on access point data obtained from server device 170. For example, the map data server can obtain access point location information from server device 170, compare locations of networks (e.g., access points) to shapes of corresponding structures, identify errors in structure shapes in map data based on the comparison, and automatically adjust the shapes of the structures so that they correspond to the shapes of the corresponding networks of related access points, as described above.

Figure 11:
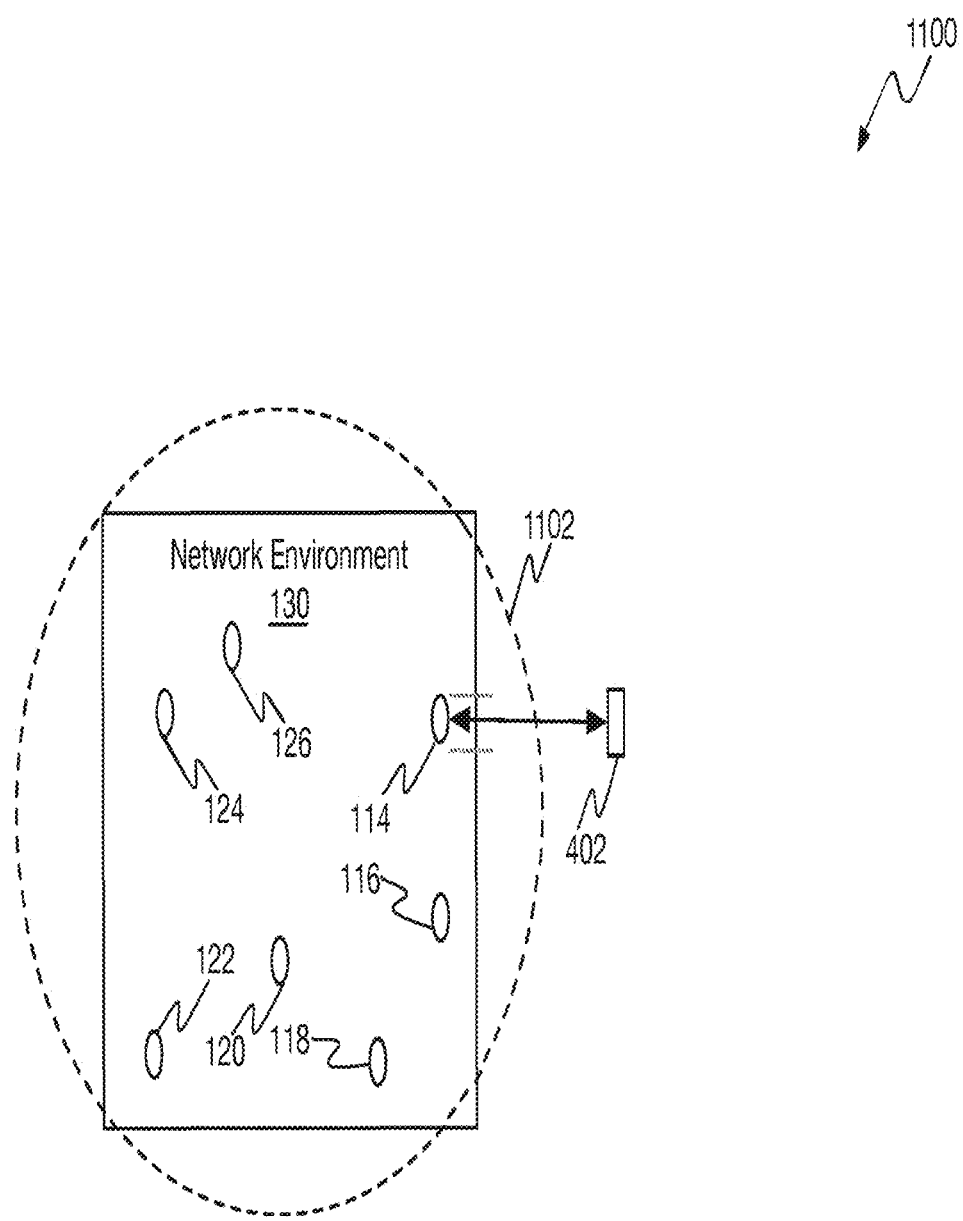
FIG. 11 is a diagram illustrating an approach for proactively disconnecting from an access point.

FIG. 11 is a diagram 1100 illustrating an approach for proactively disconnecting from an access point. For example, often user devices (e.g., user device 402) stay connected to the most recent access point as the user devices moves away from the access point. A user may leave her home or work networking environment (e.g., network environment 130), get into her car, and attempt to use a networked mapping application to get directions to a destination. However, because her device (e.g., user device 402) maintains the connection to the most recent access point (e.g., access point 114) and because of the distance between the access point and the user device, the user may observe a slow network interaction and unpleasant user experience. However, if user device 402 disconnects from access point 114 and uses a cellular data connection, the required map data may be received much faster and the user experience may be improved.

In some implementations, user device 402 may be configured to proactively disconnect from a network access point when user device 402 moves a threshold distance from network environment 130. For example, user device 402 can obtain from server device 170 access point data that defines the locations of access points 114-126 within network environment 130. User device 402 may establish a geofence 1102 around the locations of access points 114-126 such that the geofence 1102 corresponds a boundary that is a threshold distance from the edge access points corresponding to network environment 130. When user device 402 leaves the area surrounded by geofence 1102, user device 402 can automatically disconnect from the most recent access point (e.g., access point 114) so that user device 402 can obtain data using a cellular data connection rather than the now distant access point. Thus, the user may experience an improved networking experience when moving away from the access points 114-126 within network environment 130.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 12:
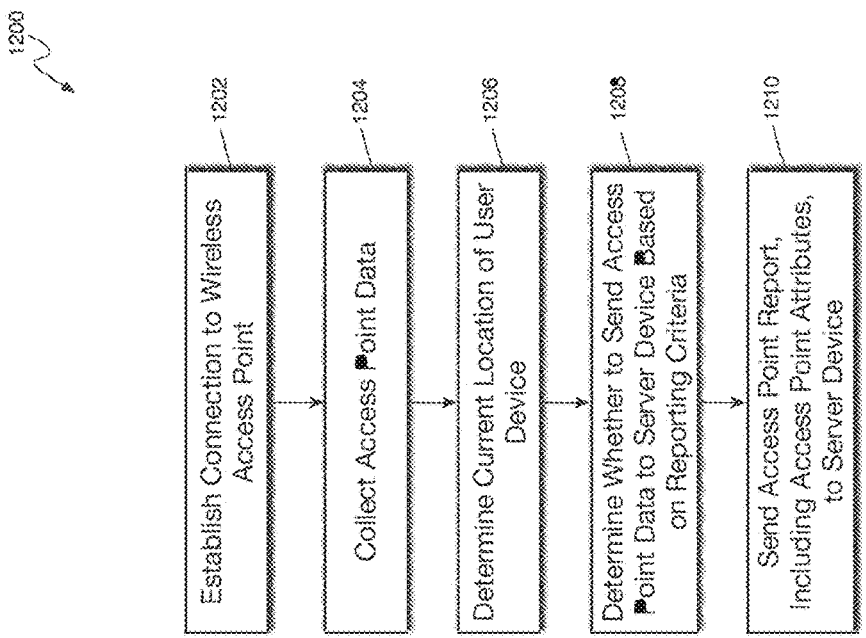
FIG. 12 is flow diagram of an example process for collecting access point data.

FIG. 12 is flow diagram of an example process 1200 for collecting access point data. For example, process 1200 can be performed by a user device (e.g., user device 140, 150, 402, etc.) to collect, generate, and report access point data corresponding to access points to which the user device has established a connection in a privacy preserving manner. In some instances, the access point data reported by the user device can include a partial representation of the access points associated with a particular network. The particular representation reported by the user device can be combined at a server (e.g. server device 170) with other access point data reports that include other partial representations of the particular network to construct a full representation of the topology of the particular network.

At step 1202, a user device can establish a connection to a wireless access point. For example, the connection to the access point can be established automatically by the user device. The connection to the access point can be established in response to user input indicating that the user of the user device wishes the user device to connect to the wireless access point.

At step 1204, the user device can collect access point data associated with the connected wireless access point. For example, the user device can collect and/or generate wireless access point attributes including, but not limited to, an access point identifier for the connected access point, related access point identifiers for detected access points that are associated with the same network identifier as the connected access point, network configuration attributes (e.g., authentication type, physical layer protocol, captive flag, moving flag, omnipresent, etc.), network statistics attributes, access point association/disassociation reason attributes, network error attributes, time of day attributes indicating when the user device was connected to the access point, a duration attribute indicating how long the user device was connected to the access point, signal quality attributes, and/or other access point attributes as may be described herein.

At step 1206, the user device can determine the current location of the user device. For example, user device can determine the current location of the user device at the time when the connection to the access point is established, terminated, and/or any time in between. The user device can select one of these locations and store the device location as an attribute in the access point data of the currently connected access point.

At step 1208, the user device can determine whether to send the access point data to the server device based on reporting criteria. For example, the user device can report the collected access point data to the server (e.g. server device 170) when the user device is not connected to the top two networks to which the user device connects most frequently. The user device can report the collected access point data to the server (e.g. server device 170) when the user device is not at a home or work location. The user device can report the collected access point data to the server (e.g. server device 170) when the user device was connected to the access point for more than a threshold period of time, and when the data transferred in/out between the user device and the access point was greater than a threshold amount of data. The user device can report the collected access point data to the server (e.g. server device 170) when a randomized determination (e.g., a random number is greater than some threshold value) indicates that the user device should send the access point data report. The user device can determine when to send the access point data report based on any or all of the criteria described above.

At step 1210, the user device can send the access point data report for the current (or most recent) access point connection to the server device. For example, the access point data report can include any or all of the access point data attributes described herein. The access point data report can be sent anonymously (e.g., without including information that can be used to identify the user device or user of the user device) and without including any network identifiers (e.g., network names) received from detected access points to protect the privacy of the user (e.g., to prevent tracking external to the user device) and to protect people and/or organizations that may include identifying information in their network identifiers.

Figure 13:
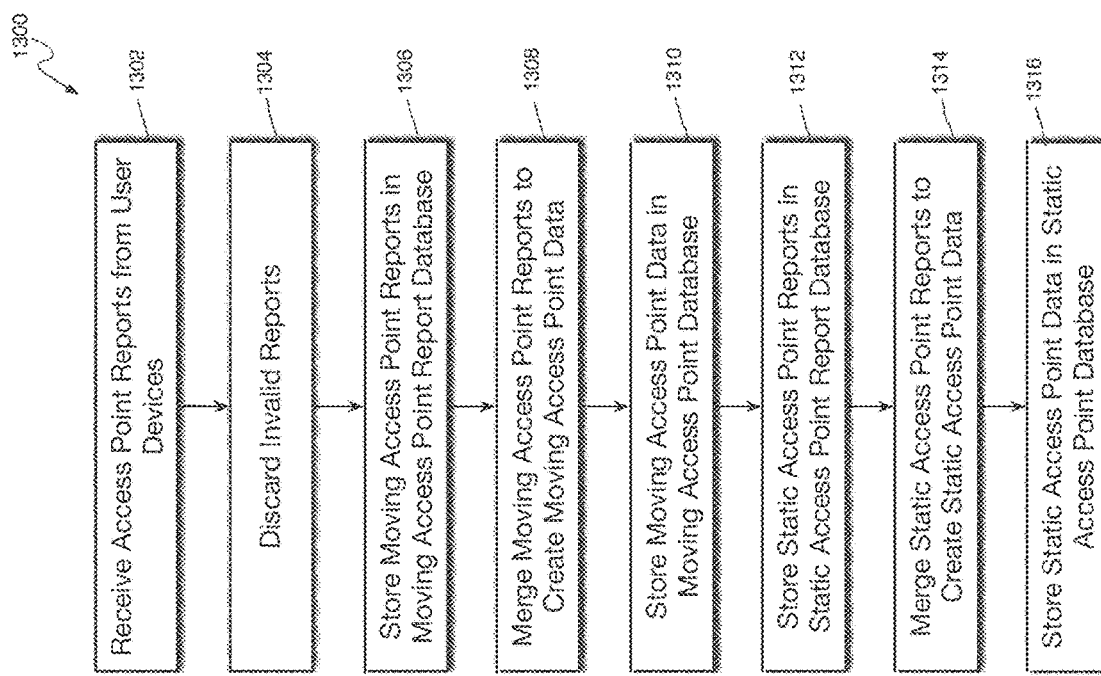
FIG. 13 is a flow diagram of an example process for merging access point data reports at a server device.

FIG. 13 is a flow diagram of an example process 1300 for merging access point data reports at a server device. For example, server device 170 can receive access point data reports from many different user devices that report connections to many different access points at many different times. Server device 170 can receive and merge these access point data reports into a coherent set of access point data that can be used to recommend access points to users, validate map data, and/or perform other useful functions on user devices. For example, server device 170 can merge many different access point data reports corresponding to a particular access point into a single coherent set of access point data for the particular access point.

At step 1302, server device 170 can receive access point data reports from various user devices. For example, server device 170 can receive access point data reports from user device 140 and/or user device 150 described above. The access point data reports can include access point data attributes related to various access points to which the various user devices have connected.

At step 1304, server device 170 can discard invalid access point data reports. For example, access point data reports that identify access points built by unvetted or untrustworthy manufacturers can be discarded. Access point data reports that include unreliable location information can be discarded. Access point data reports that correspond to locally administered networks can be discarded.

At step 1306, server device 170 can store moving access point data reports in a moving access point report database 180. For example, server device 170 can store access point data reports corresponding to moving access points separately from access point data reports corresponding to static access points, as described above.

At step 1308, server device 170 can merge moving access point data reports to create moving access point data. For example, server device 170 can combine, average, append, or otherwise aggregate the moving access point data attributes in the moving access point data report database 180 corresponding to a selected access point into a definitive set of moving access point data attributes for the selected access point. For example, server device 170 can calculate averages of the various network statistics reported for the selected moving access point. Server device 170 can store all, or a sample, of the user device locations reported for the selected moving access point so a geographic area covered by the moving access point can be determined. Other ways of combining the access point data reports for a selected moving access point may be implemented as may be described herein. When merging moving access point data reports, server device 170 can merge a sampling of access point data reports instead of all of the access point data reports to reduce the amount of processing required to generate the definitive set of access point data attributes for the selected moving access point, as described above.

At step 1310, server device 170 can store the moving access point data in moving access point database 188. For example, after generating the definitive set of moving access point data for a selected moving access point, the definitive set of moving access point data attributes can be stored in moving access point database 188, as described above.

At step 1312, server device 170 can store static access point data reports in a static access point report database 182. For example, server device 170 can store access point data reports corresponding to static (e.g., not moving) access points separately from access point data reports corresponding to moving access points, as described above.

At step 1314, server device 170 can merge static access point data reports to create static access point data. For example, server device 170 can combine, average, append, or otherwise aggregate the static access point data attributes in the static access point data report database 182 corresponding to a selected access point into a definitive set of static access point data attributes for the selected access point. For example, server device 170 can calculate averages of the various network statistics reported for the selected static access point. Server device 170 can estimate a location of the static access point based on the reported user device locations associated with the static access point. Other ways of combining the access point data reports for a selected static access point may be implemented as may be described herein. When merging static access point data reports, server device 170 can merge a sampling of access point data reports instead of all of the access point data reports to reduce the amount of processing required to generate the definitive set of access point data attributes for the selected static access point, as described above.

At step 1316, server device 170 can store the static access point data in static access point database 188. For example, after generating the definitive set of static access point data for a selected static access point, the definitive set of static access point data attributes can be stored in static access point database 186, as described above.

Figure 14:
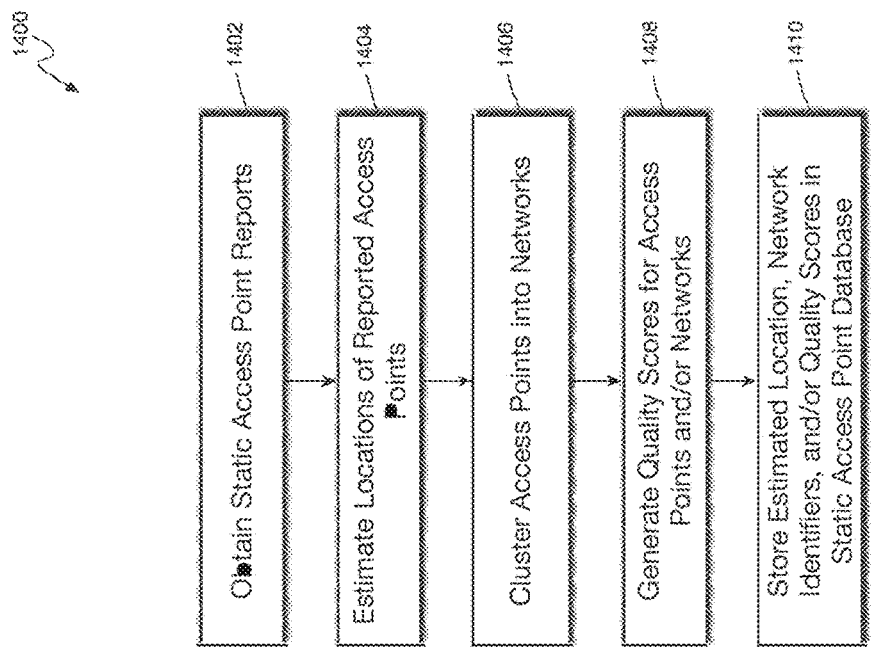
FIG. 14 is a flow diagram of an example process for processing static access point data reports at a server device.

FIG. 14 is a flow diagram of an example process 1400 for processing static access point data reports at server device 170. For example, process 1400 can be performed by server device 170 to determine locations, networks, and/or quality scores for static access points based on reported static access point data stored in static access point data report database 182.

At step 1402, server device 170 can obtain static access point reports. For example, server device 170 can obtain static access point reports from static access point report database 182.

At step 1404, server device 170 can estimate locations of reported access points. For example, for each reported access point, server device 170 can calculate the centroid location of the reported user device locations of the user devices that connected to each respective access point, as illustrated by FIG. 2. The centroid location calculated for a particular access point can be used as an estimate for the location of the particular access point.

At step 1406, server device 170 can cluster access points into network groups. For example, server device 170 can perform a clustering operation with respect to the static access point data reports to cluster the reports according to common or shared related access points, as described above with respect to FIG. 3. Since a static access point report may only identify a portion of the related access points in a network, server device 170 can identify related access points (e.g., access points associated with the same network) across multiple access point reports to generate a complete set of access points for a network and/or generate a complete network topology of access points for the network. When the access points for a network have been identified, server device 170 can assign an internal network identifier to the group or cluster of related access points that can be used to manage the network group of access points.

At step 1408, server device 170 can generate quality scores for access points and/or networks. For example, server device 170 can generate quality scores for access points and/or networks based on popularity. Server device 170 can generate quality scores for access points and/or networks based on network statistics and/or other network attributes (e.g., authentication type, physical layer network protocol, etc.). Server device 170 can generate quality scores for access points and/or networks based on a combination of popularity and network attributes.

At step 1408, server device 170 can store the estimated access point locations, network identifiers, and/or quality scores in static access point database 186. For example, server device 170 can store the estimated access point locations, network identifiers, and/or quality scores in corresponding access point records in static access point database 186 so that the estimated access point locations, network identifiers, and/or quality scores can be served to user devices and used to provide the various access point suggestions, map data validation and/or correction, and/or other features as described herein.

Figure 15:
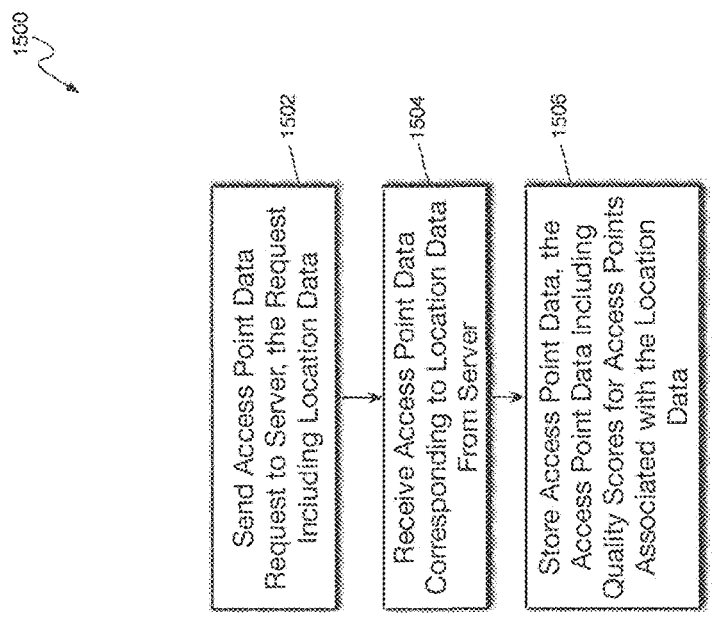
FIG. 15 is a flow diagram of an example process for requesting access point data based on location.

FIG. 15 is a flow diagram of an example process 1500 for requesting access point data based on location. For example, process 1500 can be performed by user device 402 to cache access point data for later use in providing the various access point features described herein.

At step 1502, user device 402 can send an access point data request to server device 170. For example, user device 402 can periodically request access point data from server device 170 in order to cache the access point data for later use. User device 402 can request access point data from server device 170 when user device 402 moves to a new location that is not represented in the locally stored access point data (e.g., stored map tiles, stored access point tiles, etc.). User device 402 can be configured to request access point data when user device 402 determines that user device 402 is connected to an external power source and/or connected to a Wi-Fi access point or some other high quality, non-cellular data network. In some implementations, user device 402 can include the current location of user device 402 and/or frequently visited locations of user device 402 in the access point data request, as described above.

At step 1504, user device 402 can receive access point data corresponding to the location data included in the access point data request. For example, user device 402 can receive map tiles corresponding to the locations in the access point data request and/or corresponding to an geographic area around and/or nearby the locations in the access point data request so as to provide broad coverage of the areas surrounding the locations identified in the access point data request. The map tiles can identify access points, their respective locations, and the various access point data attributes generated, aggregated, and/or merged by server device 170. The map tiles can include the access point data from static access point database 186 corresponding to access points located within the geographic areas covered by or corresponding to the map tiles, for example.

At step 1506, user device 402 can store the access point data in access point tile database 408. For example, user device 402 can store the receive map tiles and corresponding access point data (e.g., quality scores, access point locations, network groups, network statistics, etc.) in access point tile database 408.

Figure 16:
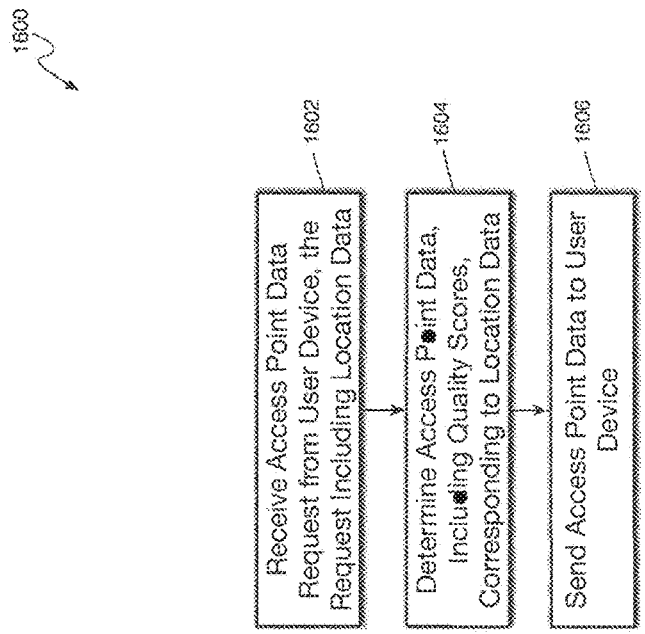
FIG. 16 is a flow diagram of an example process for serving access point data based on location.

FIG. 16 is a flow diagram of an example process 1600 for serving access point data based on location. For example, process 1600 can be performed by server device 170 to serve access point data to user devices for later use in providing the various access point features described herein.

At step 1602, server device 170 can receive an access point data request from a user device. For example, the access point data request can include location data identifying one or more locations associated with the requesting user device.

At step 1604, server device 170 can determine access point data corresponding to the location data. For example, server device 170 can query access point tile database 184 based on the location data to determine map tiles that include the locations identified in the location data and map tiles around and/or nearby the identified locations. Server device 170 can use the access point identifiers in the determined map tiles to obtain access point data corresponding to the access point identifiers from static access point database 186.

At step 1606, server device 170 can end the access point data to the requesting user device. For example, server device 170 can send the determined map tiles and access point data for the access points identified in the map tiles to the requesting user device.

Figure 17:
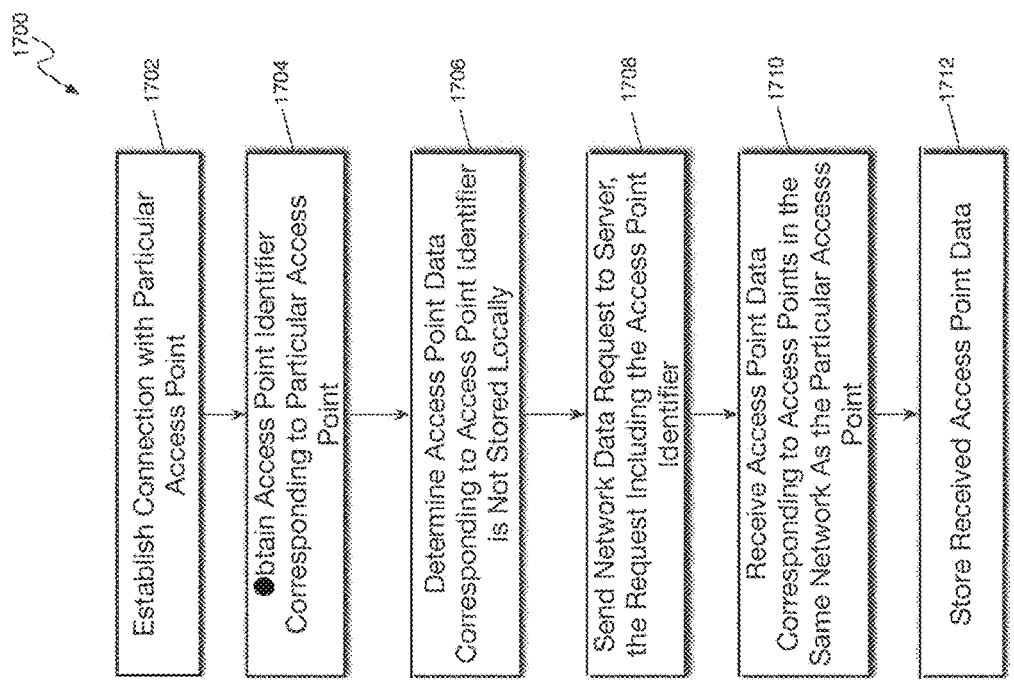
FIG. 17 is a flow diagram of an example process for requesting access point data based on an access point identifier.

FIG. 17 is a flow diagram of an example process 1700 for requesting access point data based on an access point identifier. For example, user device 402 can request access point data corresponding to an access point identifier when user device 402 does not have access point data for the access point identifier stored locally on user device 402.

At step 1702, user device 402 can establish a connection with a particular access point. For example, the access point may be a moving or static access point.

At step 1704, user device 402 can obtain an access point identifier corresponding to the particular access point. For example, user device 402 can obtain the access point identifier (e.g., MAC address) for the particular access point from messages received from the particular access point when establishing the connection with the particular access point.

At step 1706, user device 402 can determine that access point data corresponding to the access point identifier is not stored locally on user device 402. For example, user device 402 can query access point tile database 406 using the access point identifier of the particular access point to obtain access point data corresponding to the access point identifier. When the query returns no results, user device 402 can determine that access point data corresponding to the access point identifier is not currently stored on user device 402.

At step 1708, user device 402 can send a network data request to server device 170. For example, user device 402 can include in the network data request the access point identifier for the particular access point.

At step 1710, user device 402 can receive access point data corresponding to access points in the same network as the particular access point. For example, user device 402 can receive access point data (e.g., including all access point data attributes) for the particular access point and all access points in the same network group as the particular access point.

At step 1712, user device 402 can store the received access point data. For example, user device 402 can store the received access point data in memory on user device 402.

Figure 18:
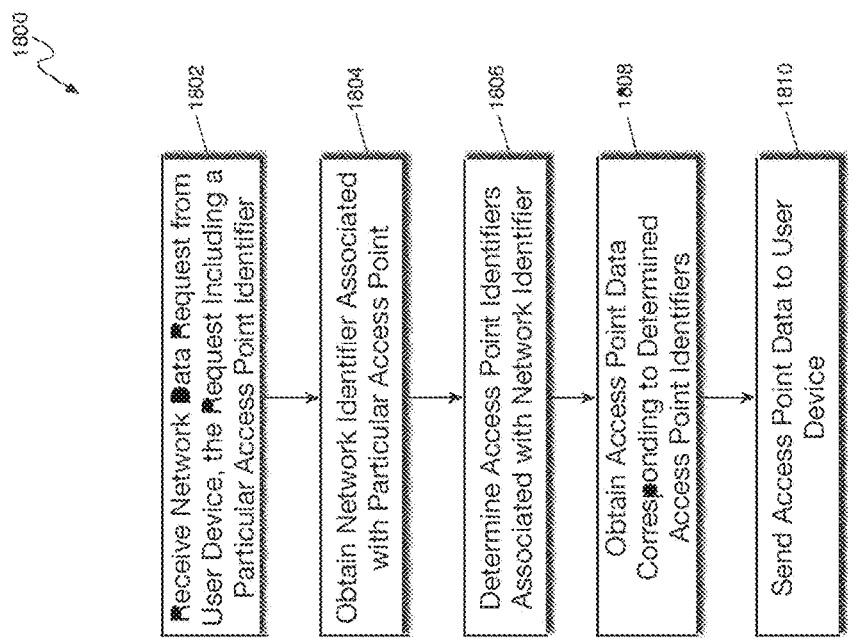
FIG. 18 is a flow diagram of an example process for serving access point data corresponding to a particular access point to a user device.

FIG. 18 is a flow diagram of an example process 1800 for serving access point data corresponding to a particular access point to a user device. For example, when server device 170 receives an access point data request with reference to a particular access point identifier, server device 170 can obtain and send access point data corresponding to the particular access point identifier and all related access point identifiers in the same network as the particular access point identifier to the requesting user device.

At step 1802, server device 170 can receive a network data request from a user device. For example, server device 170 can receive a network data request from user device 402 that includes an access point identifier.

At step 1804, server device 170 can obtain a network identifier associated with a particular access point. For example, server device 170 can user the access point identifier included in the received network data request to obtain access point data from database 186 and/or 188. The access point data can include a network identifier (e.g., internal network identifier generated by server 170).

At step 1806, server device 170 can determine access point identifiers associated with the network identifier. For example, server device 170 can use the network identifier to query databases 186 and/or 188 for all of the access points identifiers associated with the network identifier (e.g., all access points associated with the same network group).

At step 1808, server device 170 can obtain access point data corresponding to the determined access point identifiers. For example, server device 170 can use the access point identifier associated with the network identifier to query databases 186 and/or 188 for all of the access points data associated with the access point identifiers.

At step 1810, server device 170 can send the access point data to the requesting user device. For example, server device 170 can send the access point data corresponding to each access point identifier associated with the network group identified by the network identifier to the requesting user device 402.

Figure 19:
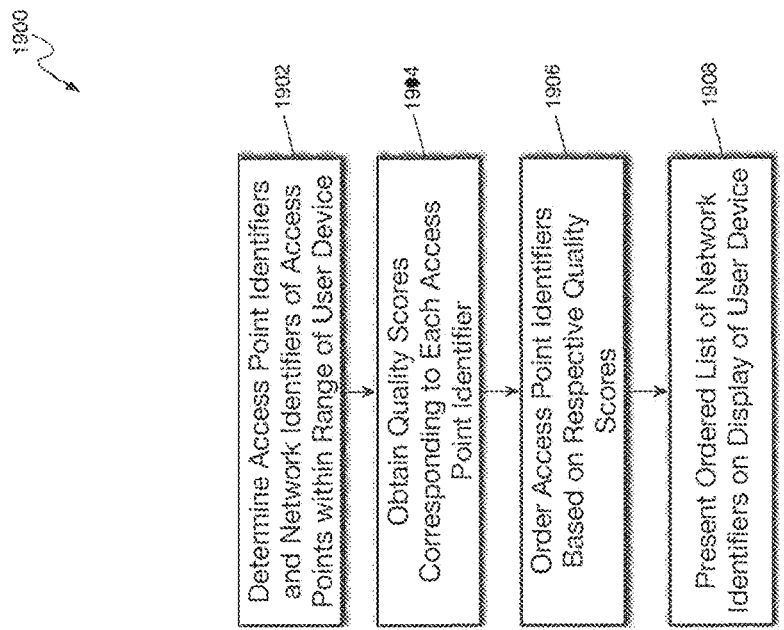
FIG. 19 is a flow diagram of an example process for ranking access points detected by a user device.

FIG. 19 is a flow diagram of an example process 1900 for ranking access points detected by a user device. For example, process 1900 can be performed by user device 402 when presenting access points (e.g., networks) for selection by a user of user device, as illustrated by FIG. 8.

At step 1902, user device 402 can determine access point identifiers and network identifiers of access points within range of user device 402. For example, user device 402 can detect access point signals from access points within range of user device 402. The access point identifiers and network identifiers (e.g., network name configured for the network associated with the access point identifiers) can be obtained from the detected wireless signals.

At step 1904, user device 402 can obtain quality scores corresponding to each access point identifier. For example, user device 402 can obtain quality scores for each access point identifier from local storage (e.g., database 408) on user device 402. User device 402 can obtain the access point quality scores from server device 170 in response to an access point data request (e.g., process 1500 or 1700) sent to server device 170.

At step 1906, user device 402 can order access point identifiers based on respective quality scores. For example, user device 402 can generate an ordered list of the detected access point identifiers based on a score representing the respective access points' popularity, network quality, or combination thereof.

At step 1908, user device 402 can present an ordered list of network identifiers on the display of user device 402. For example, user device 402 can generate a graphical user interface (e.g., GUI 800) that presents an ordered list of network identifiers that are ordered based on the ordered list of detected access point identifiers generated at step 1906. For example, at step 1902, user device 402 determined a network identifier for each detected access point. When presenting the detected network access points, user device 402 can present the network identifier associated with the access point instead of the access point identifier in the ordered list of access point identifiers. If a particular network is represented more than once in the ordered list, then user device 402 can present the network identifier for the particular network only once and select the access point that has the highest quality score as the access point that user device 402 will connect to if the user selects the particular network.

Figure 20:
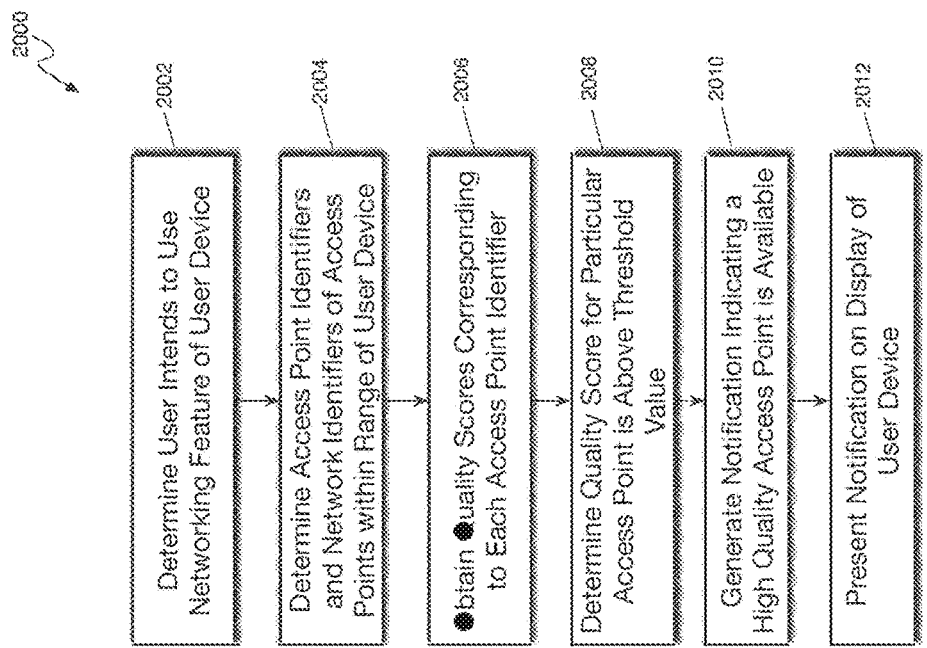
FIG. 20 is a flow diagram of an example process for notifying the user of the availability of a high-quality access point.

FIG. 20 is a flow diagram of an example process 2000 for notifying the user of the availability of a high-quality access point. For example, process 2000 can be performed by user device 402 to recommend high-quality access points (e.g., high-quality networks) when user device 402 is not currently connected to a wireless access point.

At step 2002, user device 402 can determine that the user of user device intends to use a networking feature of user device 402. For example, user device 402 can determine the user's intent to use a networking feature when the user invokes an application, foreground process, or other feature that requires or relies upon a network connection (e.g., relies on the Internet). User device 402 may not determine that the user intends to use a networking feature based on background networking processes that might be running on user device 402. Rather, the user's intent to use a networking feature can be determined based on the user's active interaction with a networking feature of user device 402.

At step 2004, user device 402 can determine access point identifier and network identifiers of access points within range of user device 402. For example, user device 402 can detect access point signals from access points within range of user device 402. The access point identifiers and network identifiers (e.g., network name configured for the network associated with the access point identifiers) can be obtained from the detected wireless signals.

At step 2006, user device 402 can obtain quality scores corresponding to each access point identifier. For example, user device 402 can obtain quality scores for each access point identifier from local storage (e.g., database 408) on user device 402. User device 402 can obtain the access point quality scores from server device 170 in response to an access point data request (e.g., process 1500 or 1700) sent to server device 170.

At step 2008, user device 402 can determine that a quality score for a particular access point is above a threshold value. For example, to distinguish a high-quality access point (e.g., network) from low quality access points, user device 402 can be configured with a threshold score value. If an access point's quality score is above the threshold value, then the access point can be identified as a high-quality access point. User device 402 can compare the quality scores corresponding to each detected access point identifier to determine which access points have quality scores above the threshold value. If user device 402 identifies access points having quality scores above the threshold value, user device 402 can select the highest scored access point that is compatible with the capabilities of user device 402 for recommending to the user.

At step 2010, user device 402 can generate a notification indicating that a high-quality access point is available. For example, user device 402 can generate a notification recommending the selected high-quality access point and/or indicating whether the quality score for the selected high-quality access point was generated based on popularity (e.g., as illustrated by FIG. 6), network statistics (e.g., as illustrated by FIG. 7), or a combination thereof. The notification can prompt the user to select the recommended access point or dismiss the notification.

At step 2012, user device 402 can present the generated notification on a display of user device 402. For example, user device 402 can present the generated notification along with graphical objects that when selected by the user cause user device 402 to connect to the recommended access point or dismiss the notification, as illustrated by FIG. 6 and FIG. 7).

Figure 21:
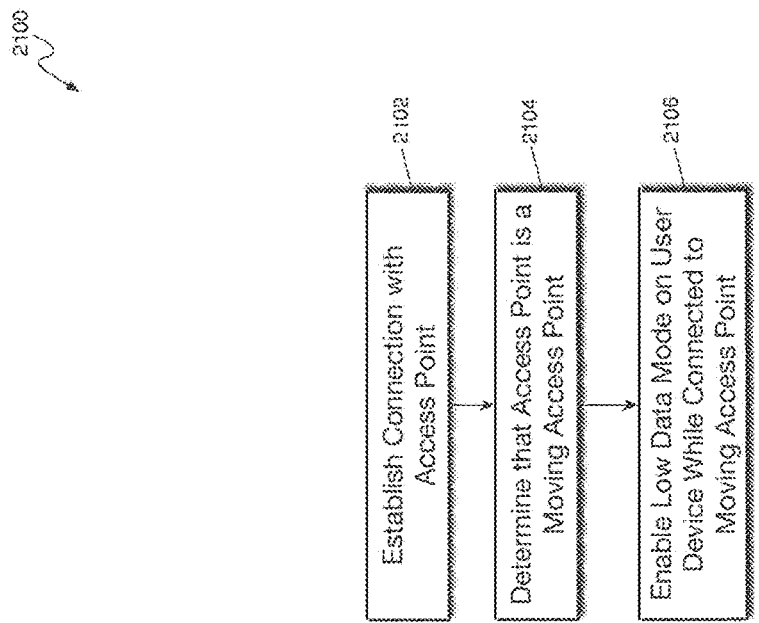
FIG. 21 is a flow diagram of an example process for adjusting the settings of a user device in response to connecting to a moving access point.

FIG. 21 is a flow diagram of an example process 2100 for adjusting the settings of a user device in response to connecting to a moving access point. For example, process 2100 can be performed by user device 402 to reduce the amount of network resources (e.g., bandwidth, data throughput, etc.) used by user device 402 when connected to network access points that may not be able to handle large amounts of network data. For example, a moving network access point can correspond to a network access point provided in a vehicle, such as an airplane, train, bus, etc. Process 2100 may also be performed when user device 402 has connected to a low-quality access point (e.g. low-quality network) rather than a moving access point.

At step 2102, user device 402 can establish a connection with an access point. For example, user device 402 can receive user input indicating that the user would like user device 402 to join with or connect to the access point to establish access to a corresponding network.

At step 2104, user device 402 can determine that the connected access point is a moving access point. For example, user device 402 can determine that the connected access point is a moving access point based on access point data stored on user device 402. Alternatively, user device 402 can determine that the connected access point is a moving access point based on the changing current location of user device 402. For example, if user device 402 can maintain a connection with the connected access point as user device 402 moves over a large distance (e.g., greater than some configured distance threshold), then user device 402 can determine that the connected access point is a moving access point.

At step 2106, user device 402 can enable a low data mode on user device 402 while connected to the moving access point. For example, the low data mode setting of user device 402 can reduce the amount of data transmitted through the moving access point and prevent network computing activities that require transmission of large amounts of data. By reducing the amount of data sent through the moving access point (e.g., low quality network), user device 402 can avoid processing delays or responsiveness delays associated with slow data transmission thereby improving the user's experience and enjoyment of user device 402.

Figure 22:
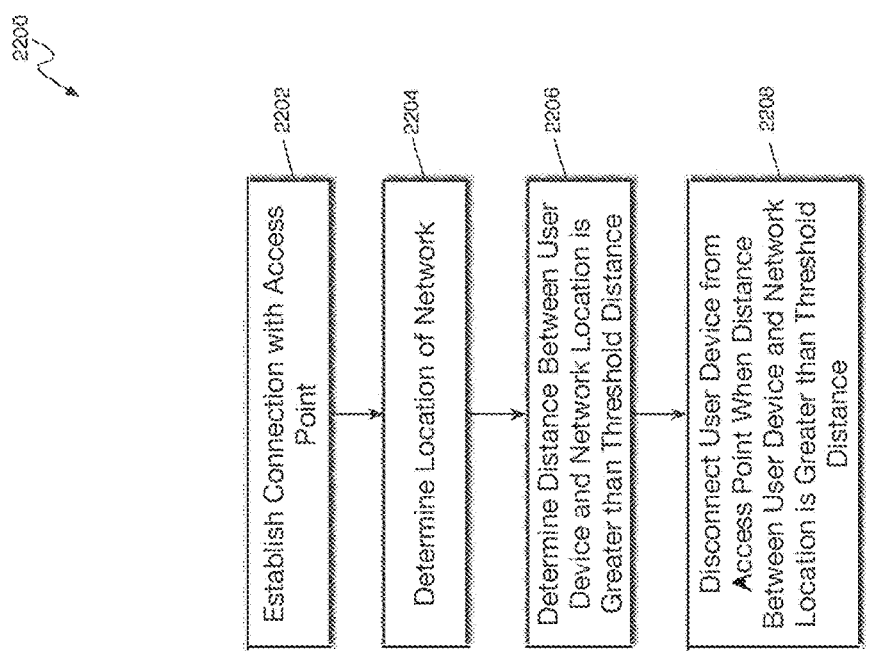
FIG. 22 is a flow diagram of an example process for proactively disconnecting from a network.

FIG. 22 is a flow diagram of an example process 2200 for proactively disconnecting from a network. For example, process 2200 can be performed by user device 402 to avoid user observable networking delays when moving away from a currently connected network and/or access point.

At step 2202, user device 402 can establish a connection with an access point. For example, the access point may be associated with zero or more related access points in a network environment. The connected access point may correspond to an access point at the edge of a network environment and may be the last access point that user device 402 connects to as user device 402 is leaving the network environment.

At step 2204, user device 402 can determine the location of the network environment associated with the connected access point. For example, when the network environment includes only one access point, user device 402 can determine that the location of the network environment is the location of the one access point. When the network environment includes multiple access points, user device 402 can determine that the location of the network environment is the centroid location of the locations of the multiple access points. Alternatively, when the network environment includes multiple access points, user device 402 can determine that the location of the network environment is the area circumscribed by the locations of the edge access points in the network environment.

At step 2206, user device 402 can determine that the distance between the user device and the network location is greater than a threshold distance. For example, user device 402 can determine a straight-line distance between the centroid location (or location of the single access point in a one access point network) and user device 402 based on well-known location determining techniques. User device 402 can determine a distance threshold from the centroid location that ensures that user device 402 is leaving the network environment (e.g., outside a perimeter defined by the edge access points). User device 402 can compare the distance between user device 402 and the centroid location to the threshold distance to determine whether the distance between user device 402 and the centroid location (e.g., network location) is greater than the threshold distance. Alternatively, user device 402 can determine that the user device 402 is farther than some threshold distance away from the perimeter of the network environment as defined by the locations of the edge access points in the network environment.

Alternatively, user device 402 can establish a geofence that encompasses all of the access points in the network environment and includes a threshold distance between the edge access points and the geofence boundary. User device 402 can determine that the distance between the user device and the network location is greater than a threshold distance when user device 402 crosses the geofence boundary.

At step 2208, user device 402 can disconnect from the currently connected access point when the distance between the user device 402 and the network location is greater than a threshold distance. For example, user device 402 can disconnect from the currently connected access point when the distance between the centroid location of the network environment and user device 402 is greater than the threshold distance. User device 402 can disconnect from the currently connected access point when the distance between the perimeter of the network environment and user device 402 is greater than the threshold distance (e.g. a smaller threshold distance than used for comparing to the centroid location). User device 402 can disconnect from the currently connected access point when the user device 402 crosses the geofence boundary that represents the threshold distance from the network.

Figure 23:
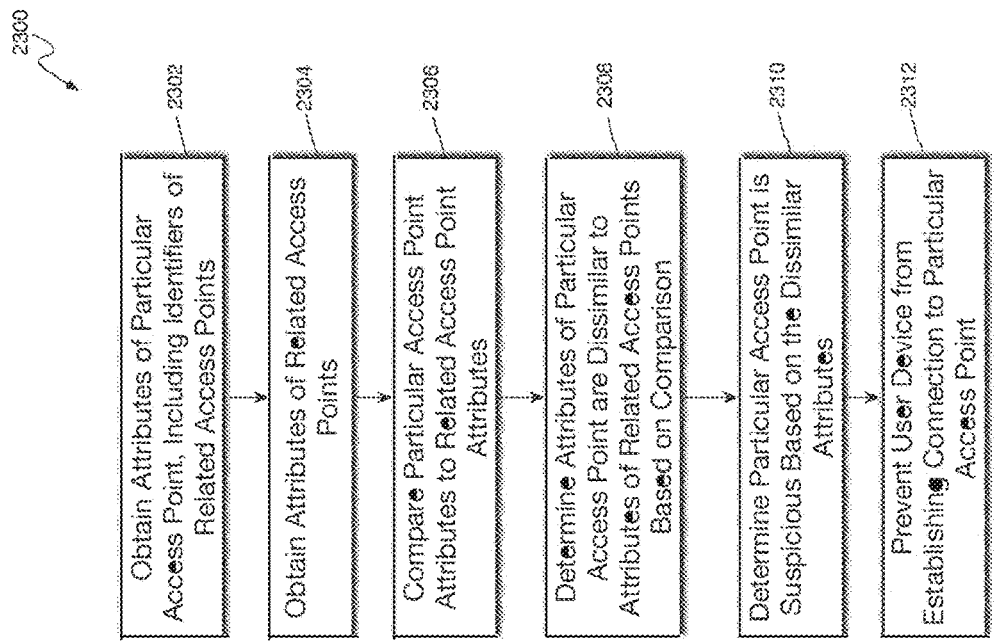
FIG. 23 is a flow diagram of an example process for detecting a malicious network access point.

FIG. 23 is a flow diagram of an example process 2300 for detecting a malicious network access point. For example, process 2300 can be performed by user device 402 and/or server device 170 to identify (e.g., spoofed) access points that are configured to appear as an access point of a trusted network when they are not.

At step 2302, a computing device can obtain attributes of a particular access point. For example, the computing device (e.g., user device 402, server device 170) can identify a particular access point. The particular access point can be an access point with which the computing device has established a connection. The particular access point can be an access point for which an access point data report has been received. The computing device can obtain access point data attributes associated with the particular access point from an access point data database accessible to the computing device. The access point data attributes can identify related access points in the same network as the particular access point. The access point data attributes can include network statistics, network configuration information, etc., for the particular access point.

At step 2304, the computing device can obtain access point data attributes corresponding to the related access point identifiers. The computing device can obtain the access point data attributes associated with the related access point identifiers from an access point data database accessible to the computing device. The access point data attributes can include network statistics, network configuration information, etc., for the related access points in the same network.

At step 2306, the computing device can determine that the access point attributes for the particular access point are dissimilar to the access point attributes of the related access points in the same network. For example, the computing device can compare the network statistics and/or network configuration in the access point attributes of the particular access point to the network statistics and/or network configuration in the access point attributes of the related access points in the same network and determine that the access point attributes for the particular access point are significantly different than the access point attributes for the related access points.

At step 2310, the computing device can determine that the particular access point is suspicious based on the dissimilar attributes. For example, access points that are associated with the same network should have similar network statistics, network configurations, etc. However, when the particular access point is associated with network statistics and/or a network configuration that is not similar to the related access points, then the computing device can identify the particular access point as a suspicious (e.g., spoofed) access point.

At step 2312, the computing device can prevent a user device from establishing a connection to the particular access point. For example, when the computing device is server device 170, server device 170 can store an access point attribute value in the access point data for the particular access point indicating that the particular access point is suspicious. User devices receiving this access point data can prevent the user devices from connecting to the suspicious access point. When the computing device is user device 402, user device 402 can prevent user device 402 from connecting to the suspicious access point. If user device 402 has already connected to the suspicious access point, user device 402 can disconnect from the suspicious access point when user device identifies the connected access point as being suspicious.

Figure 24:
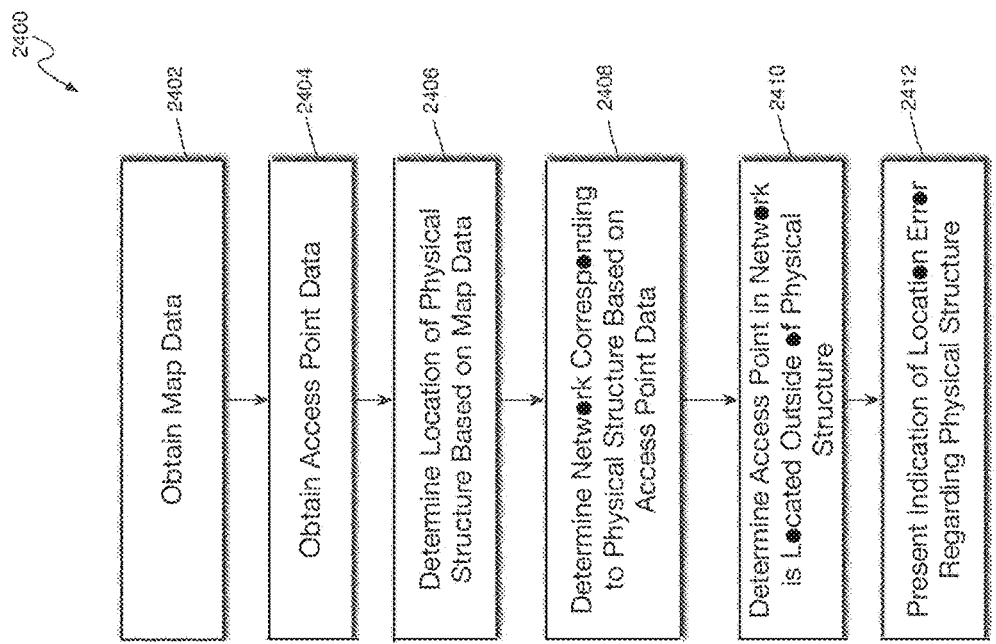
FIG. 24 is a flow diagram of an example process for validating map data using access point data.

FIG. 24 is a flow diagram of an example process 2400 for validating map data using access point data. For example, process 2400 can be performed by a computing device (e.g., user device 402, a server device, etc.) to validate map data and/or indicate that corrections to map data may be required.

At step 2402, a computing device can obtain map data. For example, the computing device can obtain map data from a map data server that identifies the locations, shapes, and/or dimensions of real-world physical structures (e.g., buildings, universities, parks, airports, etc.).

At step 2404, the computing device can obtain access point data. For example, the computing device can obtain access point data from server device 170. The access point data can identify the locations of access points and relationships between access points that are associated with the same network.

At step 2406, the computing device can determine the location of a physical structure based on the map data. For example, the computing device can determine the location, area covered, and/or perimeter of a building, university, or other physical structure.

At step 2408, the computing device can determine a network of access points corresponding to the physical structure based on the access point data. For example, the access point data identifies locations of access points. The computing device can determine which access points in the access point data have locations within the perimeter of the physical structure (e.g., building). The computing device can determine the internal network identifier for the access points located within the physical structure and use the network identifier to determine the locations of related access points that are associated with the same network as the access points located inside the physical structure.

At step 2410, the computing device can determine that an access point in the network is located outside of the physical structure. For example, the computing device can determine that the location of one or more of the related access points in the same network as the access points located inside the perimeter of the physical structure is outside of the physical structure. Since network access points are typically located inside the physical structure that they service, determining that one or more of the network access points for the network corresponding to the physical structure is located outside the perimeter of the physical structure, as defined by the map data, may indicate an error in the map data with respect to the location, shape, or area covered by the physical structure.

At step 2412, the computing device can present an indication of a possible location error regarding the physical structure. For example, the computing device can cause GUI 900 to be presented on a display device. GUI 900 can present an indication that the location of the physical structure may be incorrect. GUI 900 can highlight the access point locations that are currently located outside of the physical structure, as defined by the current map data. GUI 900 can present a graphical suggestion regarding how to change the map data to correct the location of the physical structure so that the physical structure encompasses all of the access points of the corresponding network.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the user experience when connecting and disconnecting user devices to and from wireless access points. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to suggest high quality access points, prevent collection of access point data (e.g., at home and/or office locations), and proactively disconnect from access points when leaving a network environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of access point data collection, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, access points can be recommended based on non-personal information data or a bare minimum amount of personal information, such as the content being requested by the device associated with a user, other non-personal information available to the access point recommendation services, or publicly available information.

Example System Architecture

Figure 25:
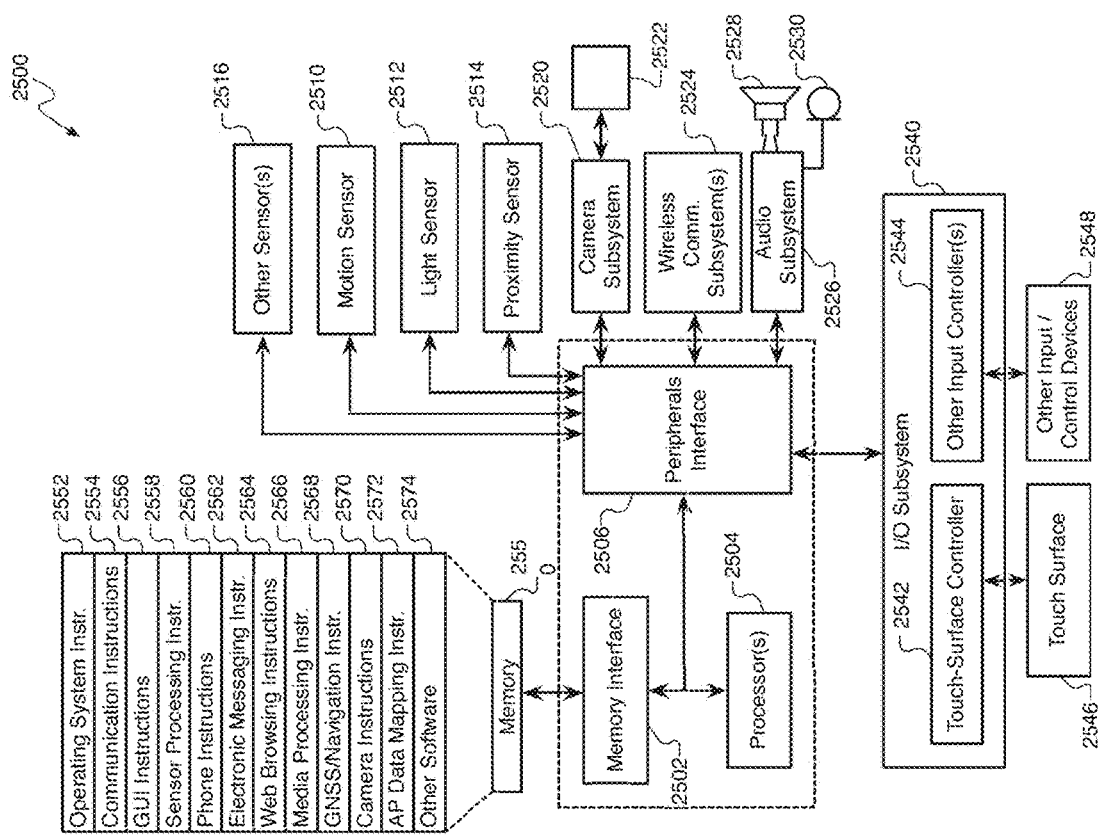
FIG. 25 is a block diagram of an example computing device that can implement the features and processes of FIGS. 1-24.

FIG. 25 is a block diagram of an example computing device 2500 that can implement the features and processes of FIGS. 1-23. The computing device 2500 can include a memory interface 2502, one or more data processors, image processors and/or central processing units 2504, and a peripherals interface 2506. The memory interface 2502, the one or more processors 2504 and/or the peripherals interface 2506 can be separate components or can be integrated in one or more integrated circuits. The various components in the computing device 2500 can be coupled by one or more communication buses or signal lines.

Sensors, devices, and subsystems can be coupled to the peripherals interface 2506 to facilitate multiple functionalities. For example, a motion sensor 2510, a light sensor 2512, and a proximity sensor 2514 can be coupled to the peripherals interface 2506 to facilitate orientation, lighting, and proximity functions. Other sensors 2516 can also be connected to the peripherals interface 2506, such as a global navigation satellite system (GNSS) (e.g., GPS receiver), a temperature sensor, a biometric sensor, magnetometer or other sensing device, to facilitate related functionalities.

A camera subsystem 2520 and an optical sensor 2522, e.g., a charged coupled device (CCD) or a complementary metal-oxide semiconductor (CMOS) optical sensor, can be utilized to facilitate camera functions, such as recording photographs and video clips. The camera subsystem 2520 and the optical sensor 2522 can be used to collect images of a user to be used during authentication of a user, e.g., by performing facial recognition analysis.

Communication functions can be facilitated through one or more wireless communication subsystems 2524, which can include radio frequency receivers and transmitters and/or optical (e.g., infrared) receivers and transmitters. The specific design and implementation of the communication subsystem 2524 can depend on the communication network(s) over which the computing device 2500 is intended to operate. For example, the computing device 2500 can include communication subsystems 2524 designed to operate over a GSM network, a GPRS network, an EDGE network, a Wi-Fi or WiMax network, and a Bluetooth™ network. In particular, the wireless communication subsystems 2524 can include hosting protocols such that the device 100 can be configured as a base station for other wireless devices.

An audio subsystem 2526 can be coupled to a speaker 2528 and a microphone 2530 to facilitate voice-enabled functions, such as speaker recognition, voice replication, digital recording, and telephony functions. The audio subsystem 2526 can be configured to facilitate processing voice commands, voiceprinting and voice authentication, for example.

The I/O subsystem 2540 can include a touch-surface controller 2542 and/or other input controller(s) 2544. The touch-surface controller 2542 can be coupled to a touch surface 2546. The touch surface 2546 and touch-surface controller 2542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2546.

The other input controller(s) 2544 can be coupled to other input/control devices 2548, such as one or more buttons, rocker switches, thumb-wheel, infrared port, USB port, and/or a pointer device such as a stylus. The one or more buttons (not shown) can include an up/down button for volume control of the speaker 2528 and/or the microphone 2530.

In one implementation, a pressing of the button for a first duration can disengage a lock of the touch surface 2546; and a pressing of the button for a second duration that is longer than the first duration can turn power to the computing device 2500 on or off. Pressing the button for a third duration can activate a voice control, or voice command, module that enables the user to speak commands into the microphone 2530 to cause the device to execute the spoken command. The user can customize a functionality of one or more of the buttons. The touch surface 2546 can, for example, also be used to implement virtual or soft buttons and/or a keyboard.

In some implementations, the computing device 2500 can present recorded audio and/or video files, such as MP3, AAC, and MPEG files. In some implementations, the computing device 2500 can include the functionality of an MP3 player, such as an iPod™.

The memory interface 2502 can be coupled to memory 2550. The memory 2550 can include high-speed random-access memory and/or non-volatile memory, such as one or more magnetic disk storage devices, one or more optical storage devices, and/or flash memory (e.g., NAND, NOR). The memory 2550 can store an operating system 2552, such as Darwin, RTXC, LINUX, UNIX, OS X, WINDOWS, or an embedded operating system such as Vx Works.

The operating system 2552 can include instructions for handling basic system services and for performing hardware dependent tasks. In some implementations, the operating system 2552 can be a kernel (e.g., UNIX kernel). In some implementations, the operating system 2552 can include instructions for performing voice authentication. For example, operating system 2552 can implement the access point mapping and recommendation features as described with reference to FIGS. 1-23.

The memory 2550 can also store communication instructions 2554 to facilitate communicating with one or more additional devices, one or more computers and/or one or more servers. The memory 2550 can include graphical user interface instructions 2556 to facilitate graphic user interface processing; sensor processing instructions 2558 to facilitate sensor-related processing and functions; phone instructions 2560 to facilitate phone-related processes and functions; electronic messaging instructions 2562 to facilitate electronic-messaging related processes and functions; web browsing instructions 2564 to facilitate web browsing-related processes and functions; media processing instructions 2566 to facilitate media processing-related processes and functions; GNSS/Navigation instructions 2568 to facilitate GNSS and navigation-related processes and instructions; and/or camera instructions 2570 to facilitate camera-related processes and functions.

The memory 2550 can store software instructions 2572 to facilitate other processes and functions, such as the access point mapping and recommendation processes and functions as described with reference to FIGS. 1-23.

The memory 2550 can also store other software instructions 2574, such as web video instructions to facilitate web video-related processes and functions; and/or web shopping instructions to facilitate web shopping-related processes and functions. In some implementations, the media processing instructions 2566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2550 can include additional instructions or fewer instructions. Furthermore, various functions of the computing device 2500 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   determining, by a user device, a first set of one or more attributes of a first access point;
   wherein the first set of one or more attributes includes at least one of network statistics or network configuration information associated with a first network corresponding to the first access point;
   identifying, by the user device, a second access point;
   determining, by the user device, a second set of one or more attributes of the second access point;
   wherein the second set of one or more attributes includes at least one of network statistics or network configuration information associated with a second network corresponding to the second access point;
   determining, by the user device, that a first attribute of the first set of one or more attributes differs from a second attribute of the second set of one or more attributes;
   responsive at least to determining that the first attribute of the first set of one or more attributes differs from the second attribute of the second set of one or more attributes: determining, by the user device, that the first access point is a suspicious access point; and
   responsive to determining that the first access point is a suspicious access point: refraining, by the user device, from connecting to the first access point.

2. The method of claim 1, further comprising:
   determining, by the user device, a third set of one or more attributes of a third access point, wherein the user device has a connection with the third access point;
   identifying, by the user device, a fourth access point related to the third access point;
   determining, by the user device, a fourth set of one or more attributes of the fourth access point;
   determining, by the user device, that the third set of one or more attributes differs from the fourth set of one or more attributes;
   responsive to determining that the third set of one or more attributes differs from the fourth set of one or more attributes: determining, by the user device, that the third access point is an additional suspicious access point; and
   responsive to determining that the third access point is an additional suspicious access point:
   terminating, by the user device, the connection with the third access point.

3. The method of claim 1, wherein the first network corresponding to the first access point and the second network corresponding to the second access point are different networks.

4. The method of claim 1, wherein the first network corresponding to the first access point and the second network corresponding to the second access point are the same network.

5. The method of claim 1, wherein the first set of one or more attributes identifies the first network.

6. The method of claim 1, wherein determining the first set of one or more attributes of the first access point includes accessing a database accessible to the user device.

7. The method of claim 1, wherein determining the second set of one or more attributes of the second access point includes obtaining from a database an access point identifier corresponding to the second access point.

8. A non-transitory computer readable medium including one or more sequences of instructions that, when executed by one or more processors, cause the one or more processors to perform operations comprising:
   determining, by a user device, a first set of one or more attributes of a first access point;
   wherein the first set of one or more attributes includes at least one of network statistics or network configuration information associated with a first network corresponding to the first access point;
   identifying, by the user device, a second access point;
   determining, by the user device, a second set of one or more attributes of the second access point;
   wherein the second set of one or more attributes includes at least one of network statistics or network configuration information associated with a second network corresponding to the second access point;
   determining, by the user device, that a first attribute of the first set of one or more attributes differs from a second attribute of the second set of one or more attributes;
   responsive at least to determining that the first attribute of the first set of one or more attributes differs from the second attribute of the second set of one or more attributes: determining, by the user device, that the first access point is a suspicious access point; and responsive to determining that the first access point is a suspicious access point: refraining, by the user device, from connecting to the first access point.

9. The non-transitory computer readable medium of claim 8, the operations further comprising:
determining, by the user device, a third set of one or more attributes of a third access point, wherein the user device has a connection with the third access point;
identifying, by the user device, a fourth access point related to the third access point;
determining, by the user device, a fourth set of one or more attributes of the fourth access point;
determining, by the user device, that the third set of one or more attributes differs from the fourth set of one or more attributes;
responsive to determining that the third set of one or more attributes differs from the fourth set of one or more attributes: determining, by the user device, that the third access point is an additional suspicious access point; and
responsive to determining that the third access point is an additional suspicious access point:
terminating, by the user device, the connection with the third access point.

10. The non-transitory computer readable medium of claim 8, wherein the first network corresponding to the first access point and the second network corresponding to the second access point are different networks.

11. The non-transitory computer readable medium of claim 8, wherein the first network corresponding to the first access point and the second network corresponding to the second access point are the same network.

12. The non-transitory computer readable medium of claim 8, wherein the first set of one or more attributes identifies the first network.

13. The non-transitory computer readable medium of claim 8, wherein determining the first set of one or more attributes of the first access point includes accessing a database accessible to the user device.

14. The non-transitory computer readable medium of claim 8, wherein determining the second set of one or more attributes of the second access point includes obtaining from a database an access point identifier corresponding to the second access point.

15. A system comprising:
one or more processors; and
a non-transitory computer readable medium including one or more sequences of instructions that, when executed by the one or more processors, cause the one or more processors to perform operations comprising:
determining, by a user device, a first set of one or more attributes of a first access point;
wherein the first set of one or more attributes includes at least one of network statistics or network configuration information associated with a first network corresponding to the first access point;
identifying, by the user device, a second access point;
determining, by the user device, a second set of one or more attributes of the second access point;
wherein the second set of one or more attributes includes at least one of network statistics or network configuration information associated with a second network corresponding to the second access point;
determining, by the user device, that a first attribute of the first set of one or more attributes differs from a second attribute of the second set of one or more attributes;
responsive at least to determining that the first attribute of the first set of one or more attributes differs from the second attribute of the second set of one or more attributes: determining, by the user device, that the first access point is a suspicious access point; and
responsive to determining that the first access point is a suspicious access point: refraining, by the user device, from connecting to the first access point.

16. The system of claim 15, the operations further comprising:
determining, by the user device, a third set of one or more attributes of a third access point, wherein the user device has a connection with the third access point;
identifying, by the user device, a fourth access point related to the third access point;
determining, by the user device, a fourth set of one or more attributes of the fourth access point;
determining, by the user device, that the third set of one or more attributes differs from the fourth set of one or more attributes;
responsive to determining that the third set of one or more attributes differs from the fourth set of one or more attributes: determining, by the user device, that the third access point is an additional suspicious access point; and
responsive to determining that the third access point is an additional suspicious access point:
terminating, by the user device, the connection with the third access point.

17. The system of claim 15, wherein the first network corresponding to the first access point and the second network corresponding to the second access point are different networks.

18. The system of claim 15, wherein the first network corresponding to the first access point and the second network corresponding to the second access point are the same network.

19. The system of claim 15, wherein the first set of one or more attributes identifies the first network.

20. The system of claim 15,
wherein determining the first set of one or more attributes of the first access point includes accessing a first database accessible to the user device; and/or
wherein determining the second set of one or more attributes of the second access point includes obtaining from a second database an access point identifier corresponding to the second access point.

* * * * *